(12) United States Patent
Markovic et al.

(10) Patent No.: US 8,465,108 B2
(45) Date of Patent: *Jun. 18, 2013

(54) DIRECTED PERFORMANCE IN MOTION CAPTURE SYSTEM

(75) Inventors: Relja Markovic, Seattle, WA (US); Stephen G Latta, Seattle, WA (US); Kevin A Geisner, Mercer Island, WA (US); Christopher Vuchetich, Seattle, WA (US); Darren A Bennett, Seattle, WA (US); Brian S Murphy, Seattle, WA (US); Shawn C Wright, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,912

(22) Filed: Sep. 5, 2012

(65) Prior Publication Data
US 2012/0326976 A1    Dec. 27, 2012

Related U.S. Application Data

(63) Continuation of application No. 12/688,804, filed on Jan. 15, 2010, now Pat. No. 8,284,157.

(51) Int. Cl.
*G09G 5/00* (2006.01)
(52) U.S. Cl.
USPC ............................................. 305/156; 715/706
(58) Field of Classification Search
USPC ................... 345/156; 715/706, 704; 348/64
See application file for complete search history.

(56) References Cited

U.S. PATENT DOCUMENTS

| | | |
|---|---|---|
| 6,256,033 B1 | 7/2001 | Nguyen |
| 6,512,838 B1 | 1/2003 | Rafii et al. |
| 6,539,931 B2 | 4/2003 | Trajkovic et al. |
| 6,674,877 B1 | 1/2004 | Jojic et al. |
| 6,950,534 B2 | 9/2005 | Cohen et al. |
| 7,227,526 B2 | 6/2007 | Hildreth et al. |

(Continued)

FOREIGN PATENT DOCUMENTS

| | | |
|---|---|---|
| CN | 1797284 A | 7/2006 |
| WO | WO2008091485 | 7/2008 |

(Continued)

OTHER PUBLICATIONS

Response to Office Action dated Sep. 24, 2012, Chinese Patent Application No. 2011100249542.

(Continued)

*Primary Examiner* — Ricardo L Osorio
(74) *Attorney, Agent, or Firm* — Vierra Magen Marcus LLP

(57) ABSTRACT

Techniques for enhancing the use of a motion capture system are provided. A motion capture system tracks movement and audio inputs from a person in a physical space, and provides the inputs to an application, which displays a virtual space on a display. Bodily movements can be used to define traits of an avatar in the virtual space. The person can be directed to perform the movements by a coaching avatar, or visual or audio cues in the virtual space. The application can respond to the detected movements and voice commands or voice volume of the person to define avatar traits and initiate pre-scripted audio-visual events in the virtual space to provide an entertaining experience. A performance in the virtual space can be captured and played back with automatic modifications, such as alterations to the avatar's voice or appearance, or modifications made by another person.

20 Claims, 18 Drawing Sheets

U.S. PATENT DOCUMENTS

| | | |
|---|---|---|
| 7,308,112 B2 | 12/2007 | Fujimura et al. |
| 7,317,836 B2 | 1/2008 | Fujimura et al. |
| 7,367,887 B2 | 5/2008 | Watabe et al. |
| 7,590,262 B2 | 9/2009 | Fujimura et al. |
| 7,704,135 B2 | 4/2010 | Harrison, Jr. |
| 7,961,174 B1 | 6/2011 | Markovic et al. |
| 8,079,938 B2 | 12/2011 | Jones et al. |
| 2002/0024517 A1 | 2/2002 | Yamaguchi et al. |
| 2004/0155962 A1 | 8/2004 | Marks |
| 2005/0215319 A1 | 9/2005 | Rigopulos et al. |
| 2007/0003915 A1 | 1/2007 | Templeman |
| 2007/0192910 A1 | 8/2007 | Vu et al. |
| 2007/0198128 A1 | 8/2007 | Ziegler et al. |
| 2007/0199108 A1 | 8/2007 | Angle et al. |
| 2008/0079752 A1 | 4/2008 | Gates |
| 2008/0124690 A1 | 5/2008 | Redlich |
| 2008/0152191 A1 | 6/2008 | Fujimura et al. |
| 2008/0215973 A1 | 9/2008 | Zalewski |
| 2009/0077504 A1 | 3/2009 | Bell |
| 2009/0122058 A1 | 5/2009 | Tschesnok |
| 2009/0141933 A1 | 6/2009 | Wagg |
| 2009/0163262 A1 | 6/2009 | Kang |
| 2009/0221368 A1 | 9/2009 | Yen et al. |
| 2009/0233770 A1 | 9/2009 | Vincent et al. |
| 2010/0093435 A1 | 4/2010 | Glaser et al. |
| 2010/0238182 A1 | 9/2010 | Geisner et al. |
| 2010/0302142 A1 | 12/2010 | French et al. |
| 2010/0306261 A1 | 12/2010 | Geisner et al. |
| 2011/0175809 A1 | 7/2011 | Markovic et al. |

FOREIGN PATENT DOCUMENTS

| | | |
|---|---|---|
| WO | WO2009007701 | 1/2009 |
| WO | WO2009059065 | 5/2009 |
| WO | WO2011087888 | 7/2011 |

OTHER PUBLICATIONS

English translation of Amendments & Arguments made in Response to Office Action dated Sep. 24, 2012, Chinese Patent Application No. 2011100249542.

Virtual Experiences, Physical Behaviors: The Effect of Presence on Imitation of an Eating Avatar—Published Date: Aug. 2009.

Virtual World—Published Date: Oct. 14, 2009 http://en.wikipedia.org/wiki/Virtual_world#Virtual_worlds_and_real_life.

Immersive Virtual Environment Technology as a Methodological Tool for Social Psychology—Published Date: 2002 https://noppa.tkk.fi/noppa/kurssi/tu-53.1330/luennot/immersive_virtual_environment_technology_as_a_methodological_tool_for_social_psychology.pdf.

Real-Time Gesture Recognition, Evaluation and Feed-Forward Correction of a Multimodal Tai-Chi Platform, HAID 2008, Sep. 15-16, 2008 http://www.springerlink.com/content/73680365433060g5/.

OpenStage (TM), Motion capture customized for the general public—Movement without limits, Copyright 2007, Organic Motion, Inc.

Qian, et al., "A Gesture-Driven Multimodal Interactive Dance System," 2004 IEEE International Conference on Multimedia and Expo (ICME), 2004, pp. 1579-1582.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Non-Final Office Action dated Dec. 8, 2011, U.S. Appl. No. 12/688,804, filed Jan. 15, 2010.

International Search Report dated Sep. 21, 2011, International Patent Application No. PCT/US2010/062647.

Response to Non-final Office Action dated Dec. 20, 2011, U.S. Appl. No. 12/688,804, filed Jan. 15, 2010

Final Office Action dated Mar. 21, 2012, U.S. Appl. No. 12/688,804, filed Jan. 15, 2010.

Response to Final Office Action dated Jul. 10, 2012, U.S. Appl. No. 12/688,804, filed Jan. 15, 2010.

Office Action dated Jul. 4, 2012, Chinese Patent Application No. 201110024954.2

English Abstract of Chinese Publication No. CN 1797284 published on Jul. 5, 2006.

Notice of Allowance and Fee(s) Due dated Aug. 1, 2012, U.S. Appl. No. 12/688,804, filed Jan. 15, 2010.

Office Action dated Jan. 14, 2013, Chinese Patent Application No. 2011100249542.

Response to Office Acion dated Feb. 7, 2013, Chinese Patent Application No. 2011100249542.

English translation of Summary of Response to Office Action and Claims Amendment dated Feb. 7, 2013, Chinese Patent Application No. 2011100249542.

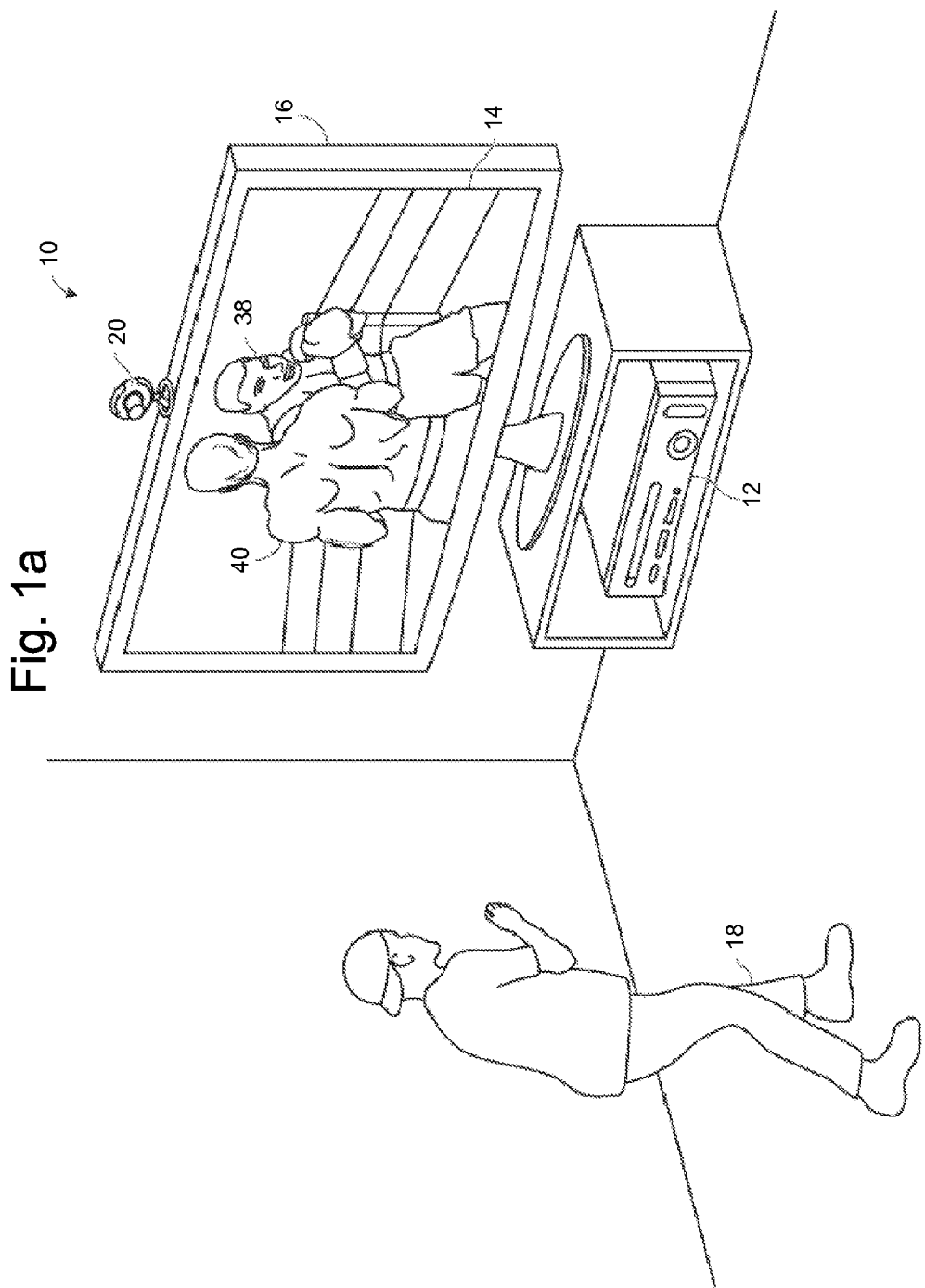

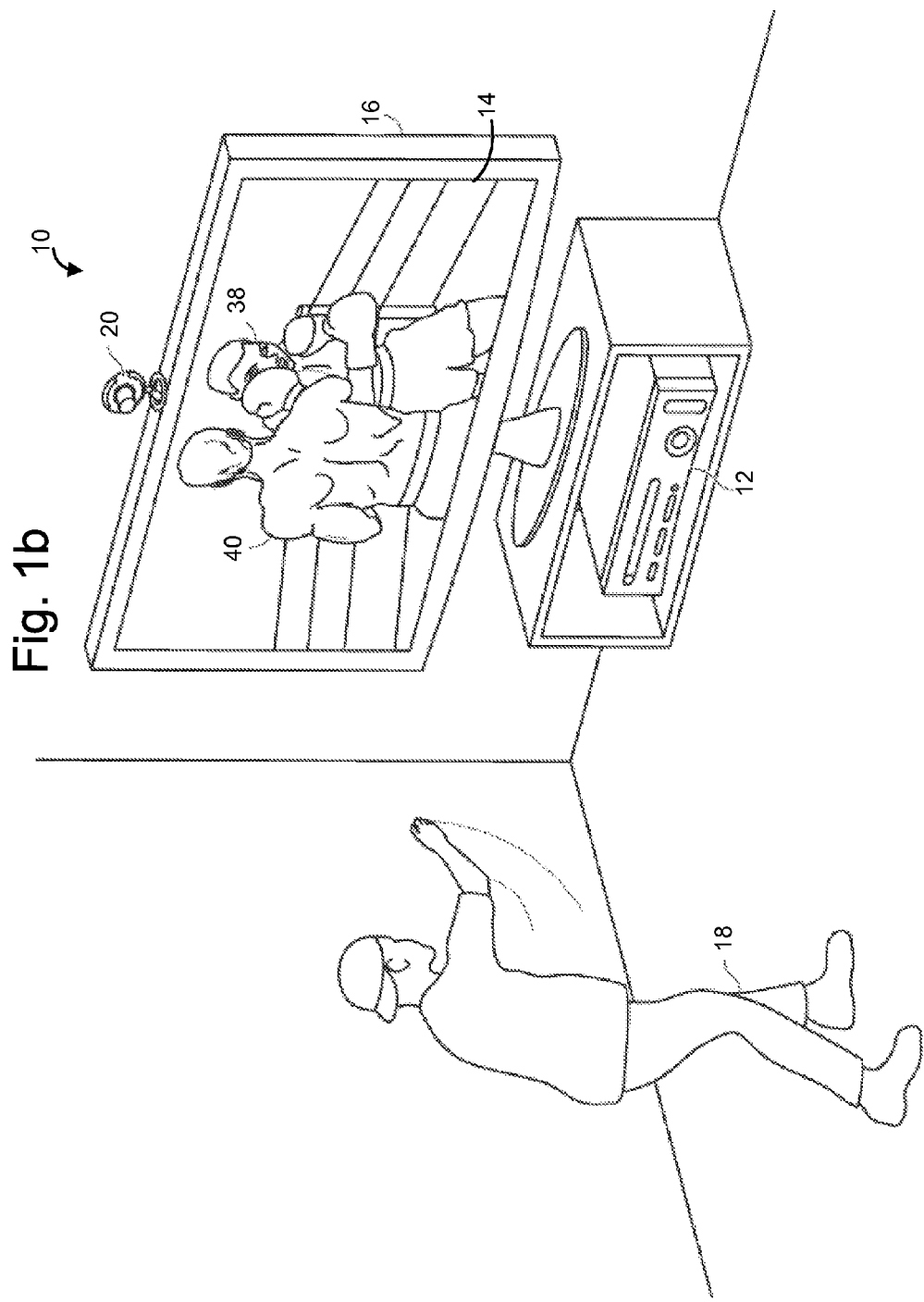

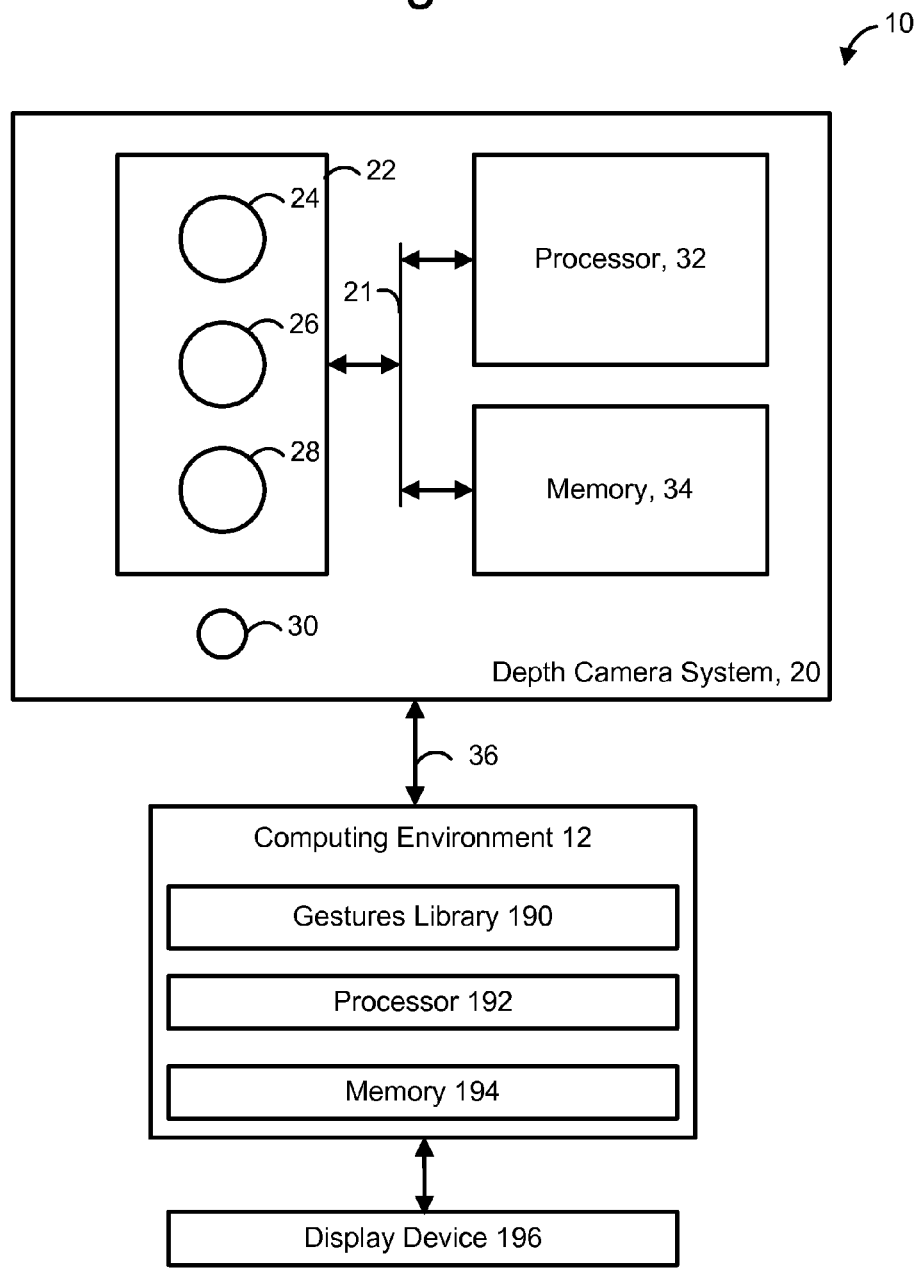

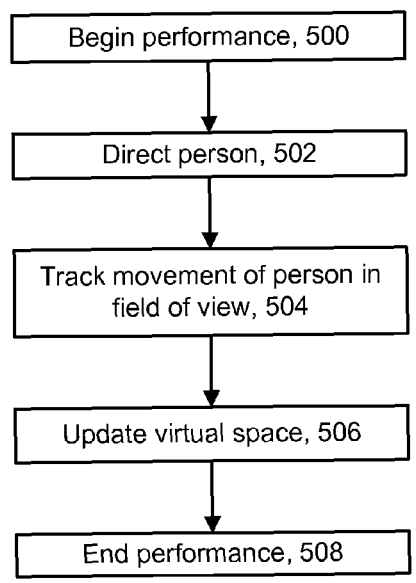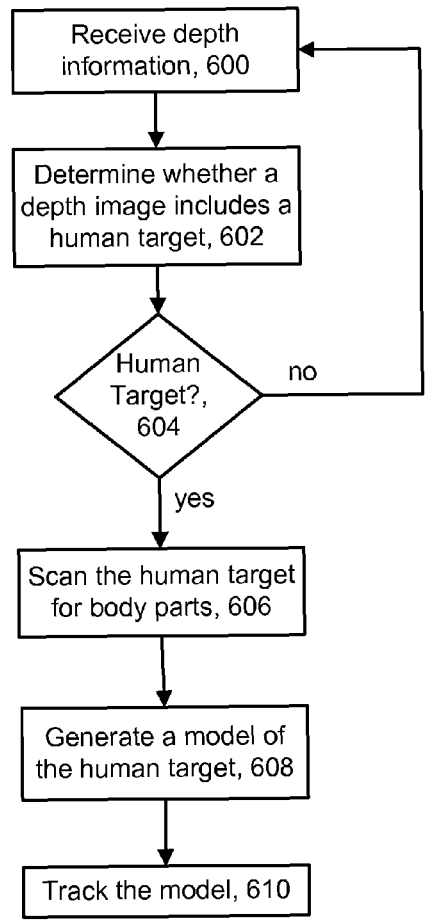

DIRECTED PERFORMANCE IN MOTION CAPTURE SYSTEM

CROSS-REFERENCE TO RELATED APPLICATIONS

This is a continuation application of U.S. patent application Ser. No. 12/688,804, entitled "Directed Performance In Motion Capture System," by Markovic et al., filed Jan. 15, 2010, published as US 2011/0175801 on Jul. 21, 2011 and issued as U.S. Pat. No. 8,284,157 on Oct. 9, 2012, and incorporated by reference herein in its entirety.

BACKGROUND

Motion capture systems obtain data regarding the location and movement of a human or other subject in a physical space, and can use the data as an input to an application in a computing system. Many applications are possible, such as for military, entertainment, sports and medical purposes. For instance, the motion of humans can be mapped to a 3d human skeletal model and used to create an animated character or avatar in a virtual space or world. Optical systems, including those using visible and invisible, e.g., infrared, light, use cameras to detect the presence of a human in a field of view. Markers can be placed on the human to assist in detection, although markerless systems have also been developed. Some systems use inertial sensors which are carried by, or attached to, the human to detect movement. For example, in some video game applications, the user holds a wireless controller which can detect movement while playing a game. However, further refinements are needed which assist a person in creating and controlling a performance in a virtual space.

SUMMARY

A processor-implemented method, motion capture system and tangible computer readable storage are provided for assisting a user in creating and controlling a performance.

A motion capture system can be used to create a performance in a virtual space which is displayed on a display device. A person's movement is tracked in a field of view of a depth camera and used an input to an application which provides the virtual space. For example, the person's movement may be translated into movement of an avatar in the virtual space, such as to allow the person to explore different visual and audible features of the virtual space. The application can direct the person in a performance in the virtual space. The person can initiate predetermined audio-visual events in the virtual space or modify traits of the avatar. Various audible and visual cues can be used, such as highlighting a location in the virtual space which an avatar can move to. The person can also be asked to perform certain bodily movements to direct the performance. Voice commands or volume of the person can also be used to direct the performance. Once the performance is completed, it can be played back with various modifications, such as changes in camera angle or the appearance of the avatar, to provide an entertaining experience. Moreover, multiple people can control a performance at the same time or at different times. A performance can be repeatedly played back and modified, such as to modify different traits of the avatar at different times.

In one embodiment, a processor-implemented method for directing a performance in a motion capture system is provided. The method includes tracking a person in a field of view of the motion capture system. The tracking distinguishes the person in the field of view, such as by using a skeletal model to identify movements of the person. A virtual space is provided on a display such as a computer monitor, television screen or projected on a wall. The virtual space can represent any real or imaginary, indoor or outdoor location. The virtual space includes an avatar which represents the person, and which moves based on the tracked movements of the person. The avatar can depict the user in a photorealistic manner, or may be an animal, vehicle or other character or object. The method includes directing movement of the person to assist in creating a performance in the virtual space. This can include requesting the person to perform a specific bodily movement, such a raising the hands over the head, or swaying from side to side. Or, cues in the virtual space may direct the person to cause the avatar to move to an identified location, or in an identified direction, in the virtual space. The person can move his body, such as by providing a specified gesture, assuming a specified posture, moving to a different location in the field of view and/or by using voice control to control the avatar.

Based on the tracking of the person, the movement of the person is detected, and the virtual space is updated to show a corresponding movement of the avatar on the display. For example, a pre-scripted audio-visual event can be initiated in the virtual space based on the detection of the movement of the person. The virtual space can also be updated to exhibit a trait of the avatar.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIGS. 1a and 1b depict an example embodiment of a motion capture system in which a user interacts with an application which simulates a boxing match.

FIG. 2 depicts an example block diagram of the motion capture system 10 of FIG. 1a.

FIG. 3 depicts an example block diagram of a computing environment that may be used in the motion capture system of FIG. 1a.

FIG. 4 depicts another example block diagram of a computing environment that may be used in the motion capture system of FIG. 1a.

FIG. 5 depicts a method for directing a performance in a motion capture system.

FIG. 6a depicts an example method for tracking movement of a person as set forth in step 504 of FIG. 5.

FIG. 6b depicts an example model of a person as set forth in step 608 of FIG. 6a.

FIG. 6c depicts another example model of a person as set forth in step 608 of FIG. 6a.

DETAILED DESCRIPTION

Figure 3:
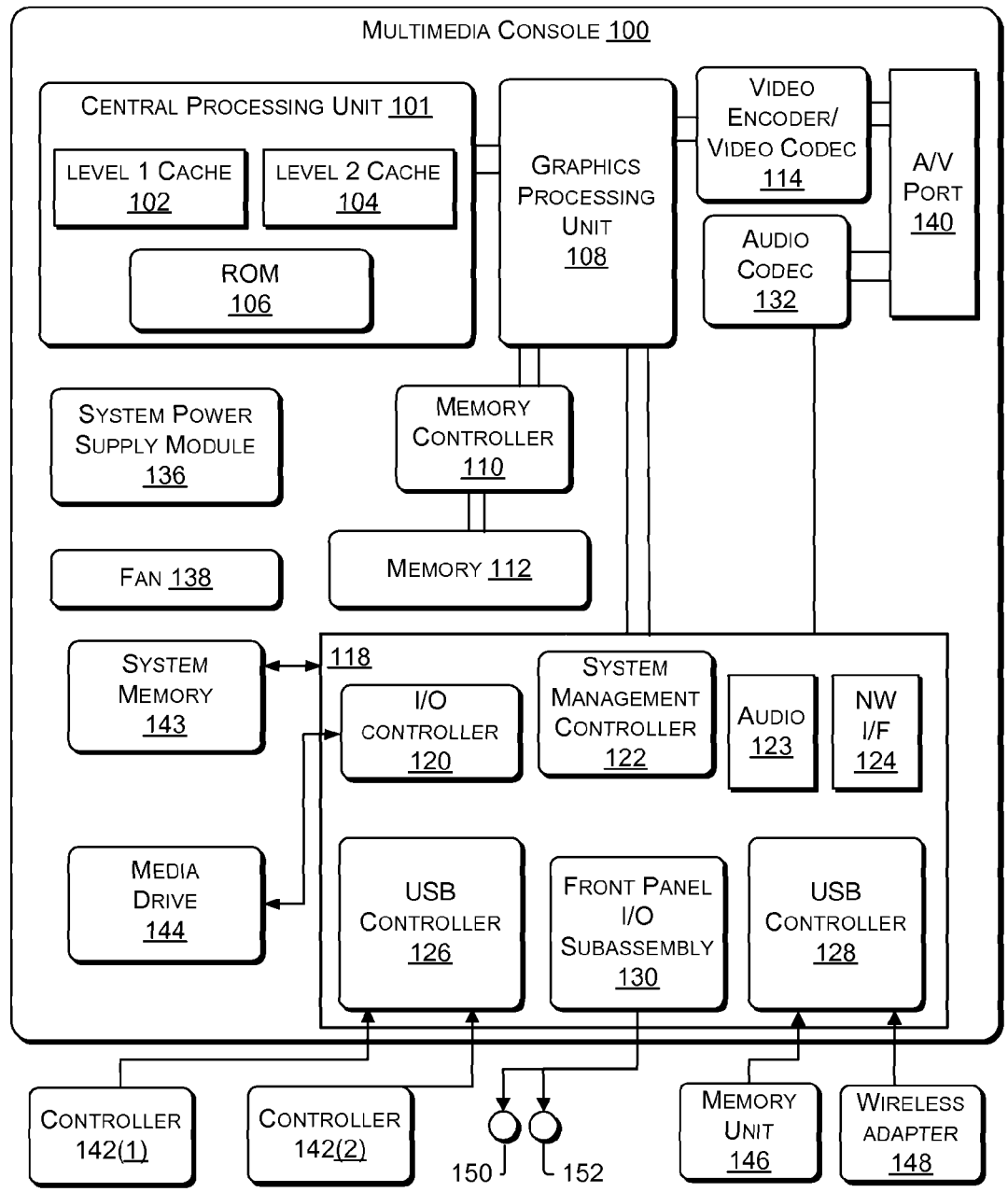

Various techniques for enhancing the use of a motion capture system are provided. A motion capture system allows a person, or group of people, to interact with an application for entertainment or other purposes. A depth camera system can track a person's movements in a physical space and translate them into inputs to the application. For example, the movements can be translated to corresponding movements of an avatar which represents the person. However, the person may not be aware of the different movements which are recognized by the application, and how specific movements are used by the application. Moreover, the response of an application may be predictable and uneventful when in fact a more dynamic and surprise-filled experience is desirable.

A solution provided herein assists a person in exploring a virtual space while providing unexpected and entertaining experiences. The person can provide specific bodily movements which result in certain events occurring in the virtual space. For example, the bodily movements can cause movement of an avatar in the virtual space. In one scenario, an audio-visual event such as an animation is initiated in the virtual space when the avatar moves to a specified location. In another scenario, the person can configure traits of the avatar through bodily movements. The person can become part of a performance which is carried out in the virtual space as a compelling entertainment experience. The performance can be captured and played back with automatic modifications, such as alterations to the avatar's voice or appearance, e.g., distortion of limbs and costume modifications, for further amusement. The person can further modify a performance which is played back so that the performance can be developed over multiple iterations or tracks. The recording and play back can include data such as audio, video, anthropometric data, skeletal position and orientation, and prop tracking data, e.g., relating to a prop which such as a plastic sword which is held by the person in the physical space.

Moreover, multiple people can be involved in the performance so that different events occur in the virtual space based on the actions of different people, or different traits of an avatar are created by different people, for instance. The different people can be in the same physical space, e.g., together in the same room, or in different physical spaces, e.g., at different locations which are connected by a network. The participation of the people can be in parallel or serial. An example of parallel participation is when people view a common virtual space at the same time and control the movement of respective avatars in the common virtual space. Multiple people can also control the movement of a single avatar in the common virtual space, such as when one person controls one part of an avatar, e.g., the head and hands, and another person controls another part of the avatar, e.g., the legs. An example of serial participation is when a first person creates a performance in a virtual space in a first time period, and a second person modifies the performance in a subsequent, second time period FIGS. 1a and 1b depict an example embodiment of a motion capture system 10 in which a person 18 interacts with an application which simulates a boxing match. The motion capture system 10 is used to recognize, analyze, and/or track a human target such as the person 18, also referred to as user or player.

As shown in FIG. 1a, the motion capture system 10 may include a computing environment 12 such as a computer, a gaming system or console, or the like. The computing environment 12 may include hardware components and/or software components to execute applications such as educational and/or entertainment purposes.

The motion capture system 10 may further include a depth camera system 20. The depth camera system 20 may be, for example, a camera that may be used to visually monitor one or more people, such as the person 18, such that gestures and/or movements performed by the people may be captured, analyzed, and tracked to perform one or more controls or actions within an application, such as animating an avatar or on-screen character, as will be described in more detail below.

The motion capture system 10 may be connected to a audiovisual device 16 such as a television, a monitor, a high-definition television (HDTV), or the like that provides a visual and audio output to the user. An audio output can also be provided via a separate device. To drive the audiovisual device 16, the computing environment 12 may include a video adapter such as a graphics card and/or an audio adapter such as a sound card that provides audiovisual signals associated with an application. The audiovisual device 16 may be connected to the computing environment 12 via, for example, an S-Video cable, a coaxial cable, an HDMI cable, a DVI cable, a VGA cable, or the like.

The person 18 may be tracked using the depth camera system 20 such that the gestures and/or movements of the person are captured and used to animate an avatar or on-screen character and/or interpreted as input controls to the application being executed by computer environment 12. Thus, according to one embodiment, the user 18 may move his or her body to control the application and/or animate an avatar or other on-screen character.

As an example, the application can be a boxing game in which the person 18 participates and in which the audiovisual device 16 provides a visual representation of a boxing opponent 38 to the person 18. The computing environment 12 may also use the audiovisual device 16 to provide a visual representation of a player avatar 40 which represents the person, and which the person can control with his or her bodily movements.

For example, as shown in FIG. 1b, the person 18 may throw a punch in physical space, e.g., a room in which the person is standing, to cause the player avatar 40 to throw a punch in a virtual space which includes a boxing ring. Thus, according to an example embodiment, the computer environment 12 and the depth camera system 20 of the motion capture system 10 may be used to recognize and analyze the punch of the person 18 in physical space such that the punch may be interpreted as an input to an application which simulates a boxing match, to control the player avatar 40 in the virtual space.

Other movements by the person 18 may also be interpreted as other controls or actions and/or used to animate the player avatar, such as controls to bob, weave, shuffle, block, jab, or throw a variety of different punches. Furthermore, some movements may be interpreted as controls that may correspond to actions other than controlling the player avatar 40. For example, in one embodiment, the player may use movements to end, pause, or save a game, select a level, view high scores, communicate with a friend, and so forth. The player may use movements to select the game or other application from a main user interface. Thus, a full range of motion of the user 18 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual space of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the person 18.

FIG. 2 depicts an example block diagram of the motion capture system 10 of FIG. 1a. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents a linear distance from the image camera component 22.

The image camera component 22 may include an infrared (IR) light component 24, a three-dimensional (3-D) camera 26, and a red-green-blue (RGB) camera 28 that may be used to capture the depth image of a scene. For example, in time-of-flight analysis, the IR light component 24 of the depth camera system 20 may emit an infrared light onto the physical space and use sensors (not shown) to detect the backscattered light from the surface of one or more targets and objects in the physical space using, for example, the 3-D camera 26 and/or the RGB camera 28. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the depth camera system to a particular location on the targets or objects.

According to another embodiment, the depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3-D camera 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gestures library 190, such as a collection of gesture filters, each having information concerning a gesture that may be performed by the skeletal model (as the user moves). For example, a gesture filter can be provided for each of: raising one or both arms up or to the side, rotating the arms in circles, flapping one's arms like a bird, leaning forward, backward, or to one side, jumping up, standing on one's toes by raising ones heel's, walking in place, walking to a different location in the field of view/physical space, and so forth. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

FIG. 3 depicts an example block diagram of a computing environment that may be used in the motion capture system of FIG. 1a. The computing environment can be used to interpret one or more gestures or other movements and, in response, update a visual space on a display. The computing environment such as the computing environment 12 described above with respect to FIGS. 1a, 1b and 2 may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
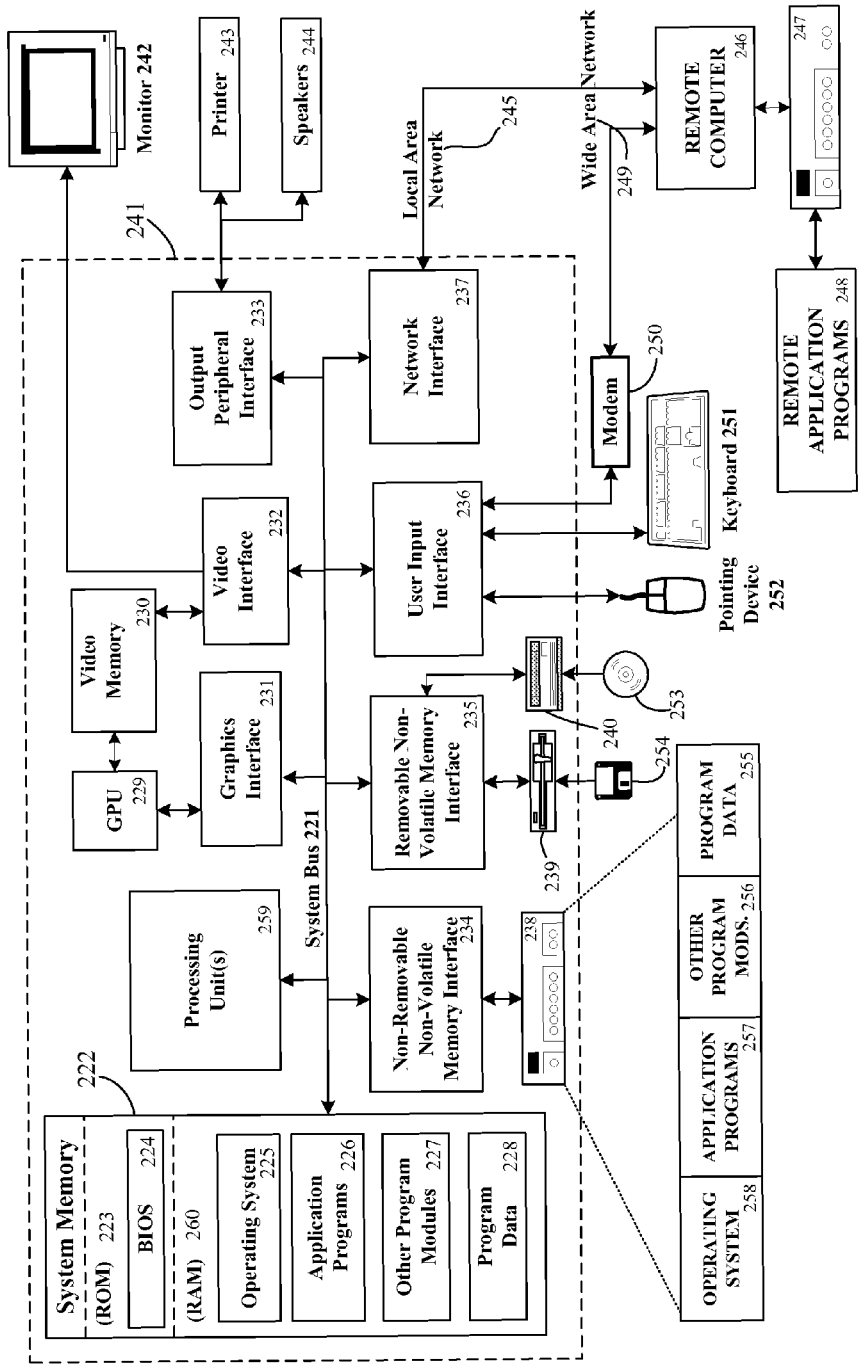

FIG. 4 depicts another example block diagram of a computing environment that may be used in the motion capture system of FIG. 1a. The computing environment can be used to interpret one or more gestures or other movements and, in response, update a visual space on a display. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

FIG. 5 depicts a method for directing a performance in a motion capture system. As mentioned at the outset, it is desirable to assist a user of a motion capture system in creating a performance that is entertaining, dynamic and surprise-filled. A performance generally refers to audio-visual events which occur in the virtual space over a period of time, which are based at least in part on motion tracking of one or more persons in one or more physical spaces. A method for directing a performance includes beginning a performance at step 500. A user may interact with an application to begin a performance in different ways. In one approach, a performance begins when an application begins running. In another approach, a running application prompts a user to begin a performance such as via a visual or audio message. In another approach, the user prompts the application to begin a performance such as by voice command or by providing a defined gesture.

At step 502, the application directs the person. In some cases, the performance can be carried out without a specific direction from the application. An example method for directing a person is discussed further below in connection with FIG. 7a. A person can be directed by an audio and/or visual output of an application. A direction can include a specific instruction, or something less specific, such as a hint. For example, a person can be directed to execute a specific bodily movement, such as raising one or both arms up or to the side, rotating the arms in circles, flapping one's arms like a bird, leaning forward, backward, or to one side, jumping up, standing on one's toes by raising ones heel's, walking in place, walking to a different location in the field of view/physical space, and so forth. A specific bodily movement can include a repetitive movement or a one-time movement. An example of an audio output of an application is a spoken instruction by an application, e.g., "To get started, raise both arms." The instruction can be provided by an avatar or other animated character in the virtual space, or in a region of a display which is separate from the virtual space. Or, the instruction can be spoken without reference to any displayed entity. An example of a visual output of an application is a textual on-screen message which is not part of the virtual space, but is in a separate region of a display, such as at the bottom of the display, or on a separate display than the virtual space. Another example of a visual output of an application is a textual on-screen message which is part of the virtual space, e.g., on the side of a building or on a banner pulled by an airplane.

An application can also direct movement of a person by directing movement of an avatar in a virtual space. For example, an arrow or other sign can be provided in the virtual space, or a location in the virtual space can be highlighted such as by color coding, a spotlight or the like. The person moves his body to cause the avatar to move in a specified direction and/or to a specified location. For instance, the person can lean in one direction or raise an arm on one side to cause the avatar to move in a corresponding direction in the virtual space. Or, the person can walk in place or perform some other movement which is recognized by the motion capture system as an input to the application for moving the avatar.

Step 504 includes tracking movement of the person in the field of view, e.g., as discussed further in connection with FIG. 6a. Step 506 includes updating the virtual space, e.g., as discussed further in connection with FIGS. 7b, 8a-8c, 9a-9f, 10a, 10b, 11a and 11b. The virtual space is updated in essentially real-time so that movements of the person appear to cause immediate and continuous changes in the virtual space. The performance ends at step 508.

FIG. 6a depicts an example method for tracking movement of a person as set forth in step 504 of FIG. 5. The example method may be implemented using, for example, the depth camera system 20 and/or the computing environment 12, 100 or 220 as discussed in connection with FIGS. 2-4. One or more people can be scanned to generate a model such as a skeletal model, a mesh human model, or any other suitable representation of a person. The model may then be used to interact with an application that is executed by the computing environment. The scanned to generate the model can occur when an application is started or launched, or at other times as controlled by the application of the scanned person.

The person may be scanned to generate a skeletal model that may be tracked such that physical movements or motions of the user 58 may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 600, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image having a plurality of observed pixels, where each observed pixel has an observed depth value, as discussed.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, discussed in connection with FIGS. 6b and 6c.

At decision step 604, a determination is made as to whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 604 is true, step 506 is performed. If decision step 604 is false, additional depth information is received at step 600.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model, discussed in connection with FIGS. 6b and 6c. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Figure 6B:
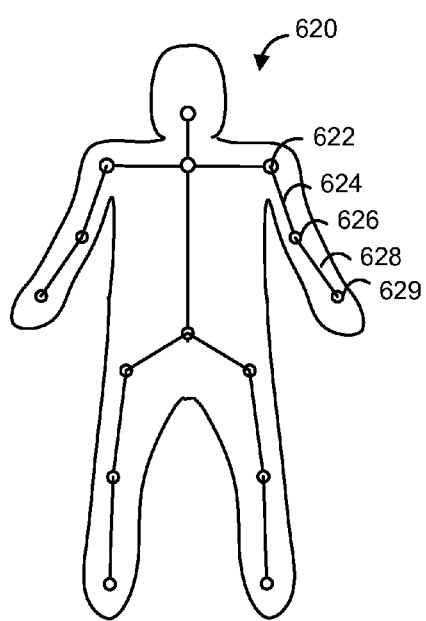
Figure 6C:
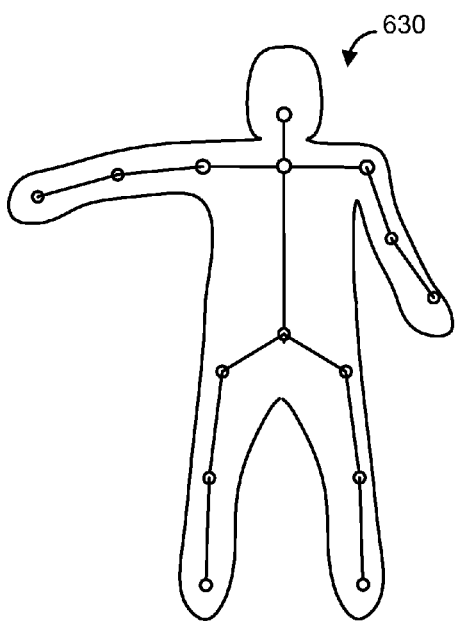

Step 608 includes generating a model of the human target. In one embodiment, measurement values determined by the scanned bitmask may be used to define one or more joints in a skeletal model. The one or more joints are used to define one or more bones that correspond to a body part of a human. For example, FIG. 6b depicts an example model 620 of a person as set forth in step 608 of FIG. 6a, and FIG. 6c depicts another example model 630 of a person as set forth in step 608 of FIG. 6a.

Generally, each body part may be characterized as a mathematical vector defining joints and bones of the skeletal model. Body parts can move relative to one another at the joints. For example, a forearm segment 628 is connected to joints 626 and 629 and an upper arm segment 624 is connected to joints 622 and 626. The forearm segment 628 can move relative to the upper arm segment 624.

One or more joints may be adjusted until the joints are within a range of typical distances between a joint and a body part of a human to generate a more accurate skeletal model. The model may further be adjusted based on, for example, a height associated with the human target.

At step 610, the model is tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of a person can be used.

Figure 7A:
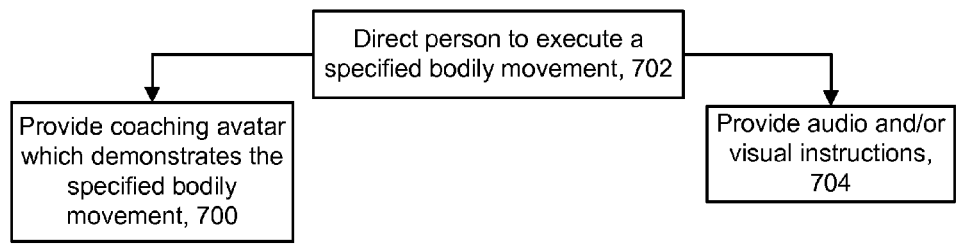
FIG. 7a depicts an example method for directing a person as set forth in step 502 of FIG. 5, where the person is directed to perform a bodily movement.

FIG. 7a depicts an example method for directing a person as set forth in step 502 of FIG. 5, where the person is directed to perform a bodily movement. Step 702 includes directing a person to execute a specific bodily movement. As discussed in connection with FIG. 5, this could include providing an audio or visual output of the application which directs a person to perform a movement such as raising ones arms, leaning over, jumping up and so forth. Step 700 indicates that a coaching avatar can be provided on the display which demonstrates the specific bodily movement. An example of a coaching avatar is provided in connection with FIGS. 7c, 7d, 9c and 9d. A coaching avatar can be an animated character which is displayed in the virtual space or other portion of a display, such as a corner region of a display screen. The avatar can appear to be a realistic or cartoon like human or other human, a robot, or other figure. The avatar generally should have a body, and the ability to move, which are sufficiently similar to those of a human so that the avatar can execute bodily movement which can be recognized by the person in the physical space. The coaching avatar can be provided at desired times to inform a user that a specific bodily movement can result in some action in the virtual space. The resulting action can be an animation or other audio-visual presentation in the virtual space which is surprising and entertaining. The coaching avatar can be provided, e.g., when the person's avatar reaches a certain location in the virtual space, has accomplished some other specified goal, or when input from the person is needed to continue the application. Or, the coaching avatar can be provided to assist the person in creating a performance in the virtual space, such as by defining traits of an avatar.

For instance, if the person is to be coached in raising one arm to the side, the coaching avatar can raise its arm to its side. The application can also provide audio instructions regarding the requested bodily movement, e.g.: "Raise your left arm to your side." The audio instructions can appear to come from the coaching avatar by moving coaching avatar's lips or otherwise animating the coaching avatar so that it appears to be speaking.

Step 704 includes providing audio and/or visual instructions, apart from a coaching avatar. As discussed in connection with FIG. 5, this could include a visual output of the application in the virtual space, or in a region of a display which is separate from the virtual space. An example of a visual output of an application is a textual on-screen message which is not part of the virtual space, but is in a separate region of a display. The textual on-screen message could say, e.g.: "Raise your left arm to your side." Another example of a visual output of an application is a textual on-screen message which is part of the virtual space, e.g., on the side of a building, or on a banner pulled by an airplane, or in a sign that is held up by an animated character in the virtual space. Audio instructions can include instructions that are spoken, with or without reference to any displayed entity.

Generally, any known technique for recognizing specified movements of a person can be used. One example uses the gesture library 190, discussed in connection with FIG. 2.

Figure 7B:
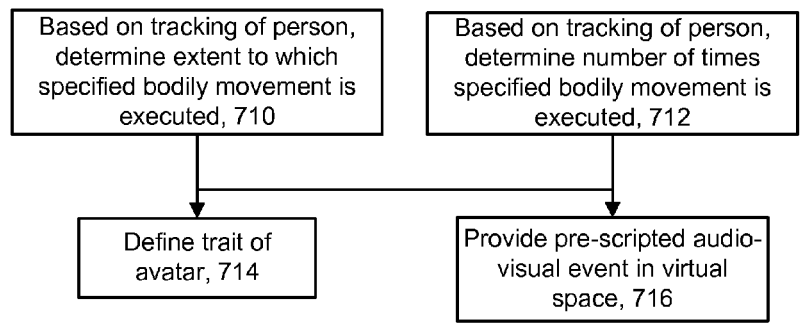
FIG. 7b depicts an example method for updating a virtual space as set forth in step 506 of FIG. 5, and in connection with FIG. 7a, where the virtual space is updated based on a person performing a bodily movement.

FIG. 7b depicts an example method for updating a virtual space as set forth in step 506 of FIG. 5, and in connection with FIG. 7a, where the virtual space is updated based on a person performing a bodily movement. A virtual space of an application is responsive to a person's movements in a physical space so that the person can interact with the application in a natural way. For instance, in the example of a boxing match simulation in FIGS. 1a and 1b, a specific bodily movement such as a punch thrown by the person in a physical space is translated by the application into a punch thrown by a boxing avatar in the virtual space of a boxing ring. An additional possible feature determines an extent to which a specific bodily movement is executed by a person, based on the tracking of the person's movements (step 710). For example, a bodily movement such as leaning to one's side can be performed to different extents. A slight lean of e.g., 10-20 degrees from vertical might represent a smaller extent while a lean of, e.g., 20-30 degrees represents a larger extent. Similarly, a bodily movement of raising one's arm can be achieved by an arm raise of, e.g., −20 degrees below horizontal to horizontal (0 degrees), which represents a smaller extent, and an arm raise of, e.g., horizontal (0 degrees) or anywhere above horizontal, represents a larger extent. Different extents can be similarly defined for jumping, waving and other bodily movements.

Another option, which can be used separately or with step 710, is to determine a number of times a specific bodily movement is executed by a person, based on the tracking of the person's movements (step 712). For example, a bodily movement of raising one's arm can be achieved by repeatedly recognizing an arm raise, where the arm is returned to a relaxed position at the person's side between arm raises. A count can be made of the number of arm raises in a specified amount of time. A frequency of arm raises could also be determined.

Based on steps 710 and/or 712, the application can take one or more actions. Step 714 includes defining a trait of an avatar. A trait is a distinguishing quality or personal characteristics of an avatar and can include its appearance, including its facial appearance and expression, poses and posture, manner of walking and moving, voice, including tone and manner of speaking, including accent, and so forth. Thus, a person's bodily movements can be translated into definitions of one or more traits, including an initial definition and a modified definition which is used in place of the initial definition. This provides many interesting and entertaining ways in which a person can define traits of an avatar, as discussed further below in connection with FIGS. 9a-9f.

Step 716 includes providing a pre-scripted audio-visual event in the virtual space. A pre-scripted audio-visual event can be a predetermined event which is stored by the application, and subsequently accessed and executed over a period of time, such as several seconds, when one or more specified conditions are met, based on movement of the person interacting with the application and/or audio input from the person. A pre-scripted audio-visual event can be a dynamic event which is designed to surprise the user, for instance. For example, the person may execute a specific bodily movement such as raising one's arm outward to the side to define the height of an avatar, where the avatar becomes taller when the specific bodily movement is executed to a greater extent, and/or in proportion to the number of times the specific bodily movement is executed. In this case, the pre-scripted audio-visual event can involve an animation of the avatar suddenly jumping up and dancing around and shouting "I'm tall!" when it reaches a certain height. The visual of the avatar moving can be accompanied by a voice of the avatar or other audio such as music.

Other examples of pre-scripted audio-visual events include one or more characters other than the person's avatar performing some action, singing or speaking in the virtual space, an effect such as fireworks or an explosion, a door opening while creaking, a tree swaying and rustling in the wind, and so forth.

There are many interesting and entertaining ways in which a person can initiate a pre-scripted audio-visual event in the virtual space, as discussed further below in connection with FIGS. 8b, 8c, 11a and 11b.

In FIG. 7b, steps 714 and 716 could also be responsive to an audio input from the person in the physical space. For example, the volume with which the person speaks can be detected and use to define a trait of an avatar. For instance, the person could repeatedly speak the word "taller!" with or without the related raising of the arm, so that the avatar becomes taller when the voice is louder, and/or when the word "taller" is repeated multiple times.

Figure 7C:
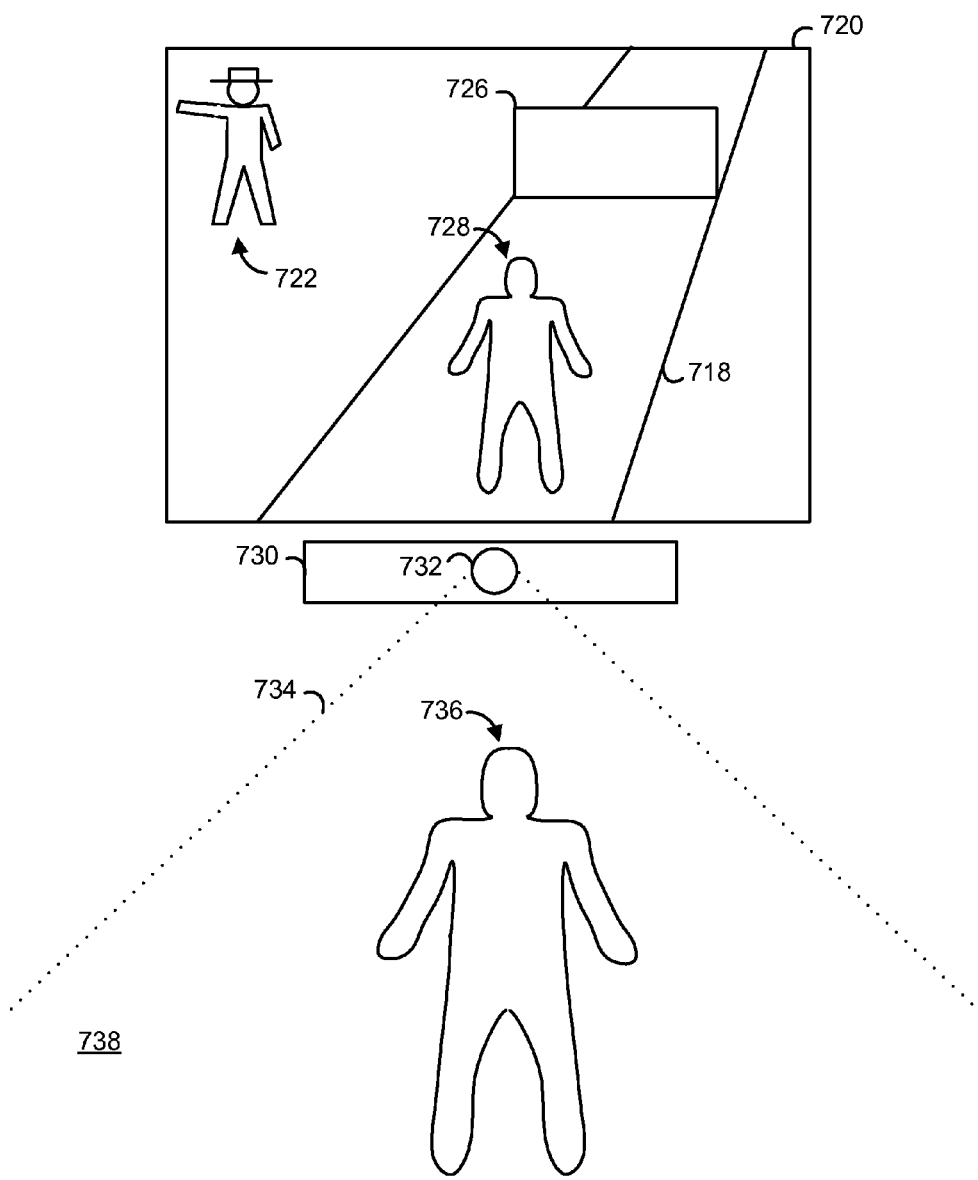
FIGS. 7c and 7d depict example displays which demonstrate a coaching avatar, and initiating a pre-scripted audio-visual event in response to execution of a specific bodily movement.
Figure 7D:
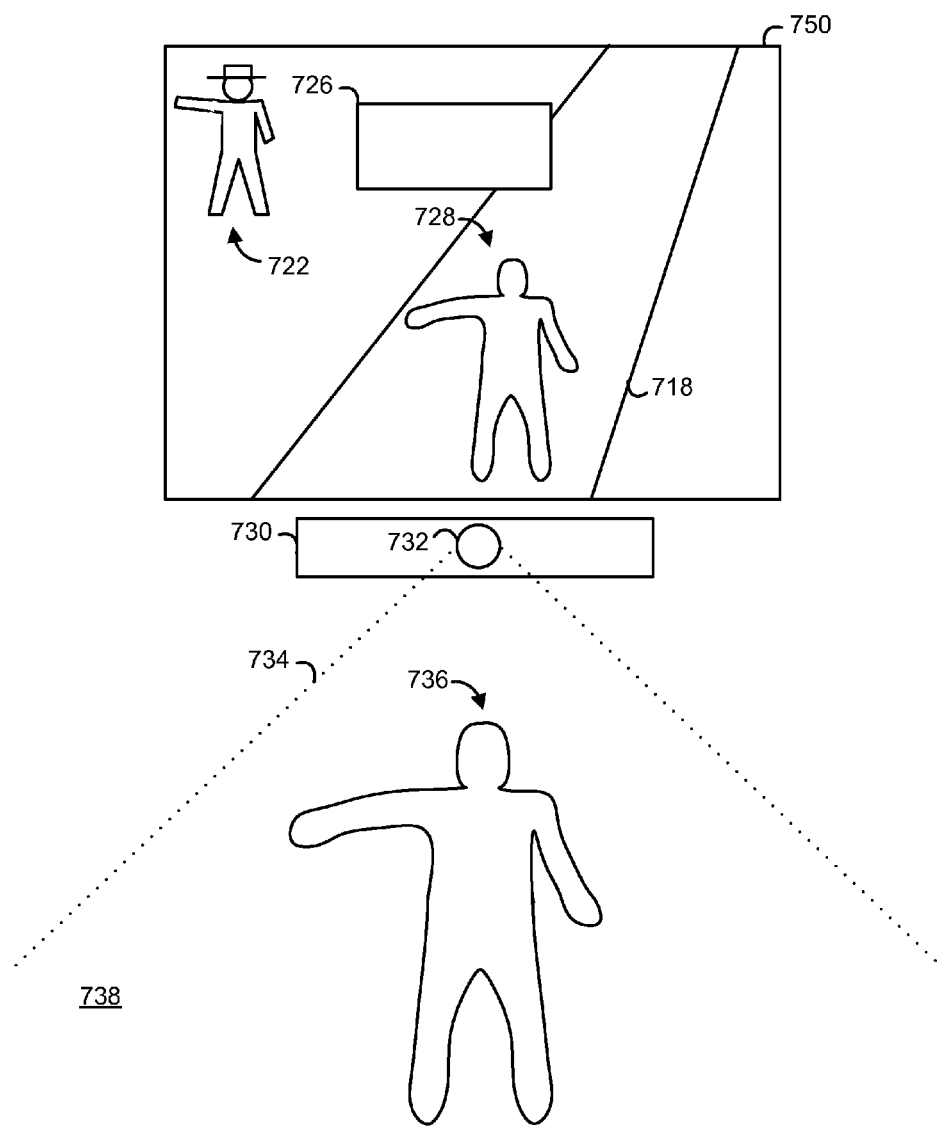

FIGS. 7c and 7d depict example displays which demonstrate a coaching avatar, and initiating a pre-scripted audio-visual event in response to execution of a specific bodily movement. In FIG. 7c, a display 720 and depth camera system 730 are depicted. The depth camera system 730 has an example sensor 732 with a field of view 734 (between dotted lines) in a physical space 738 for detecting movement of a person 736. An example application includes a virtual space having a road 718 on which an avatar 728 of the person 736 walks. However, the road is blocked by a wall 726. The wall may appear in the display after the avatar 728 has been walking on the road 718 for a while, for instance. At this time, a coaching avatar 722 may appear to assist the person 736 in getting past the wall. The coaching avatar may demonstrate a specific bodily movement, such as raising its arm and pointing to the left, as viewed by the person. This coaches or directs the person to perform the same movement. The coaching avatar may also speak, e.g.: "Point this way to move the wall." The person 736 has not yet followed the direction by pointing to the left. The avatar 728 has a corresponding bodily posture as the person, with its arms down by its side.

In FIG. 7d, the person 736 follows the directions by pointing to the left, and the avatar moves correspondingly in the display 750. As a result of this specific bodily movement being executed, a pre-scripted audio-visual event occurs in which the wall 726 moves to the left, thereby unblocking the road 718 so the avatar 728 can continue to walk down the road. The movement of the wall could be accompanied by audio such as the sound of a large object moving or music, for instance. The direction of movement of the wall corresponds to the direction of movement of the person in this example, but this is not necessary. As an alternative, the wall could disappear into the road when the movement is performed. Also as a result of the specific bodily movement being executed, a pre-scripted audio-visual event can occur in which the coaching avatar 722 dances and shouts before disappearing.

Figure 8A:
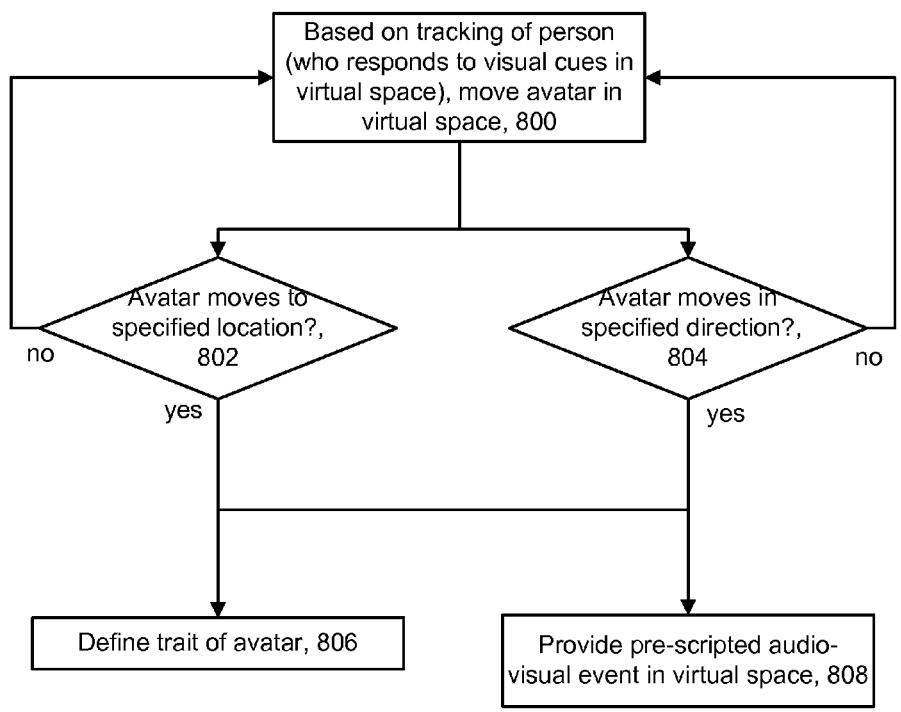
FIG. 8a depicts another example method for updating a virtual space as set forth in step 506 of FIG. 5, where the virtual space is updated based on an avatar moving in the virtual space.

FIG. 8a depicts another example method for updating a virtual space as set forth in step 506 of FIG. 5, where the virtual space is updated based on movements of the avatar. In this case, visual cues are provided on the display to direct movement of the avatar and the person. A location and/or direction in the virtual space can be identified. Examples of visual cues are provided in FIGS. 8b and 8c. Step 800 includes moving an avatar in a virtual space based on tracking of a person who responds to the visual cues. At decision step 802, if the avatar has moved to the specified location, a trait of the avatar can be defined at step 806 and/or a pre-scripted audio-visual event, discussed previously, can be provided in the virtual space at step 808. An example of defining a trait of the avatar is making the avatar taller, or giving the avatar special capabilities or powers, when it moves to a specified location. At decision step 804, if the avatar has moved in the specified direction, steps 806 and/or 808 can follows. At decision steps 802 and 804, if the avatar has not yet moved to the specified location, the avatar can be moved further at step 800.

Figure 8B:
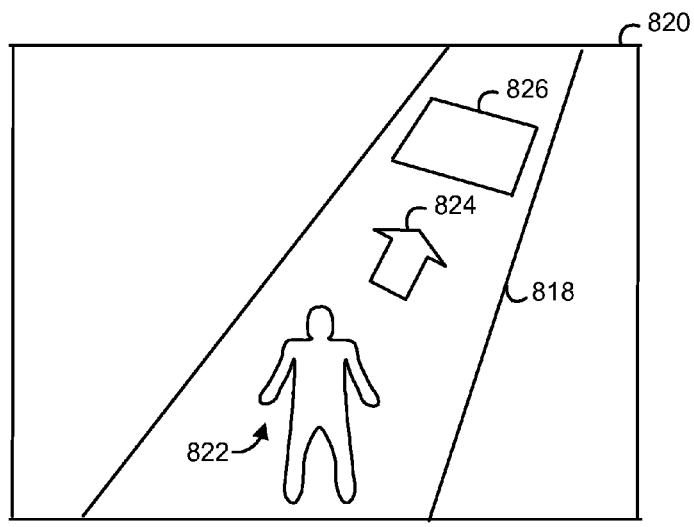
FIG. 8b depicts an example display in connection with the method of FIG. 8a, where visual cues are provided in a virtual space for directing movement of an avatar.

FIG. 8b depicts an example display in connection with the method of FIG. 8a, where visual cues are provided in a virtual space for directing movement of an avatar. In a display 820, an avatar 822 walks on a road 818. Visual cues include an arrow 824 on the road and a highlighted region 826 on the road. The region 826 may be highlighted by color coding or a lighting effect such as a spot light, for instance. The visual cues direct the user to move so that the avatar 822 is controlled to move in the specified direction of the arrow 824 and to the specified location, e.g., the region 826.

Figure 8C:
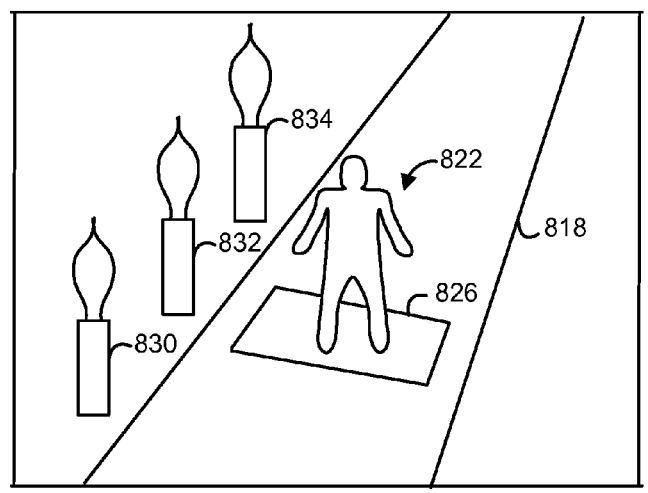
FIG. 8c depicts an example display which follows the display of FIG. 8c, where a pre-scripted audio-visual event is provided when the avatar moves to a specified location in the virtual space.

FIG. 8c depicts an example display which follows the display of FIG. 8c, where a pre-scripted audio-visual presentation is provided when the avatar moves to a specified location in the virtual space. When the avatar 822 reaches the region 826, an example of a pre-scripted audio-visual presentation involves torches 830, 832 and 834 appearing alongside the road 818, such as by rising up from the ground. Au audio presentation can include a sound of machinery as the torches rise and the sound of a flame burning. The torches may provide light that assists the avatar in walking down the road, for instance, or otherwise provides a surprising and entertaining experience for the person.

Figure 9A:
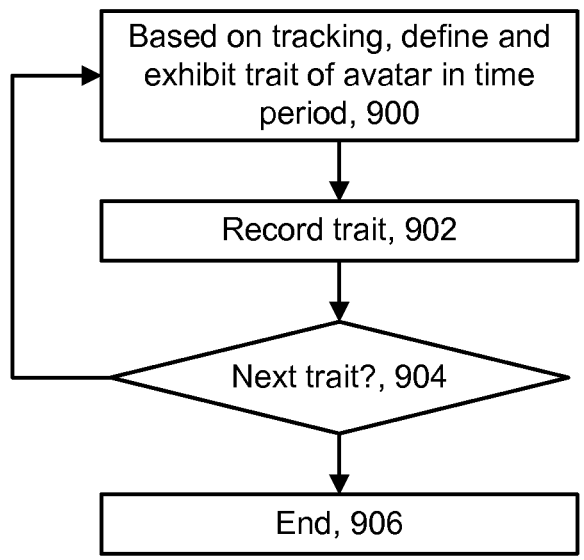
FIG. 9a depicts another example method for updating a virtual space as set forth in step 506 of FIG. 5, where traits of an avatar are defined in different time periods.

FIG. 9a depicts another example method for updating a virtual space as set forth in step 506 of FIG. 5, where traits of an avatar are defined in different time periods. As mentioned, a trait is a distinguishing quality or personal characteristics of an avatar and can include its appearance, including its facial appearance and expression, poses and posture, manner of walking and moving, voice, including tone and manner of speaking, including accent, and so forth. Typically, in a virtual space such as a game environment, traits of an avatar are predefined by the game, or the user has the ability to enter commands via on-screen user interface using a keyboard or mouse, for instance. In an entertaining alternative, one or more traits can be defined by the user via his or her movements and/or voice. For example, step 900 includes defining and exhibiting a trait of an avatar in a time period based on tracking of the person. For instance, the avatar can be provided initially on the display with one or more initial traits, which could include having a body shape similar to a detected shape of the person in the physical space. In one possible approach, the person is directed in defining the trait at a specified time, although this is not required. The trait is exhibited as it is defined as a form of feedback to the person. For example, exhibiting an appearance trait can include displaying the appearance trait, and exhibiting a vocal trait can include the avatar speaking using the vocal trait.

The trait is recorded at step 902, such as by storing information which identifies the trait, so that it can be exhibited in the future. For example, the stored information can identify the relative height, width, and body shape of the avatar, or a tone of voice. At decision step 904, if there is a next trait to define, steps 900 and 902 are repeated. For example, a person can define a first trait in a first time period and a second trait in a second time period. If decision step 904 is false, the process ends at step 906.

Figure 9B:
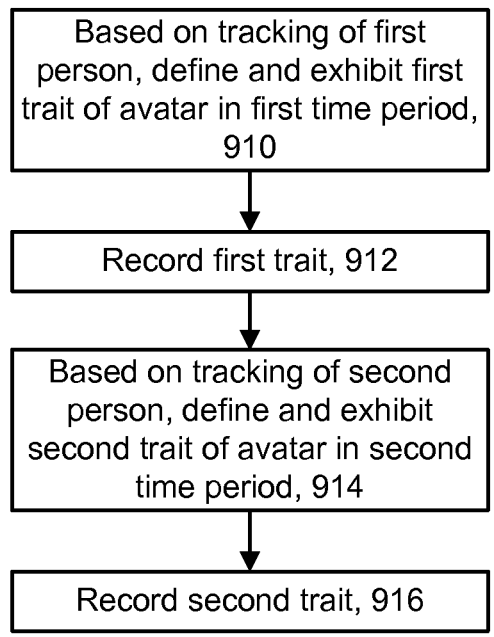
FIG. 9b depicts another example method for updating a virtual space as set forth in step 506 of FIG. 9a, where traits of an avatar are defined in different time periods by different people.

FIG. 9b depicts another example method for updating a virtual space as set forth in step 506 of FIG. 9a, where traits of an avatar are defined in different time periods, serially, by different people. Generally, multiple people can provide inputs to the same application, at the same or different physical locations, to update an avatar of a virtual space. For example, network technologies allow different players to interact in a common virtual environment using respective avatars. In one approach, first and second people may be friends who have motion capture systems in their respective homes. In one approach, each person can define a different trait of the avatar. For example, step 910 indicates that a first person's movements can be tracked to define and exhibit a first trait of an aviator in a first time period. For instance, in the example of FIG. 9c, discussed further below, the first person may define a trait regarding the avatar's arm length. Step 912 indicates that the first trait is recorded. Step 914 indicates that a second person's movements can be tracked to define and exhibit a second trait of an aviator in a second time period, after the first time period. For instance, in the example of FIG. 9d, discussed further below, the second person may define a trait regarding the avatar's head size. Step 916 indicates that the first trait is recorded. The process can be continued with additional traits and people.

In one approach, the second person views the avatar in the virtual space as its first trait is being defined by the first person. Or, the first person can define the first trait and subsequently inform the second person that it is his or her turn to define a trait. The second person then defines the trait at a later time, and the people can communicate back and forth to create a performance in the virtual space with additional traits. In another approach, the first and second persons define the first and second traits, respectively, in parallel, at the same time.

Generally, people can capture, share, and re-record on top of previous performances in the virtual space. A second person could replace the vocal track of a first person in a performance and then resend that modified performance back to the first person. Or, the second person could put their face close to the motion capture camera to capture their facial appearance, and have that placed on a captured body shape of the first person to provide a new experience. Or, the second person could re-record dialogue over the first person's dialogue. Many variations are possible.

Figure 9C:
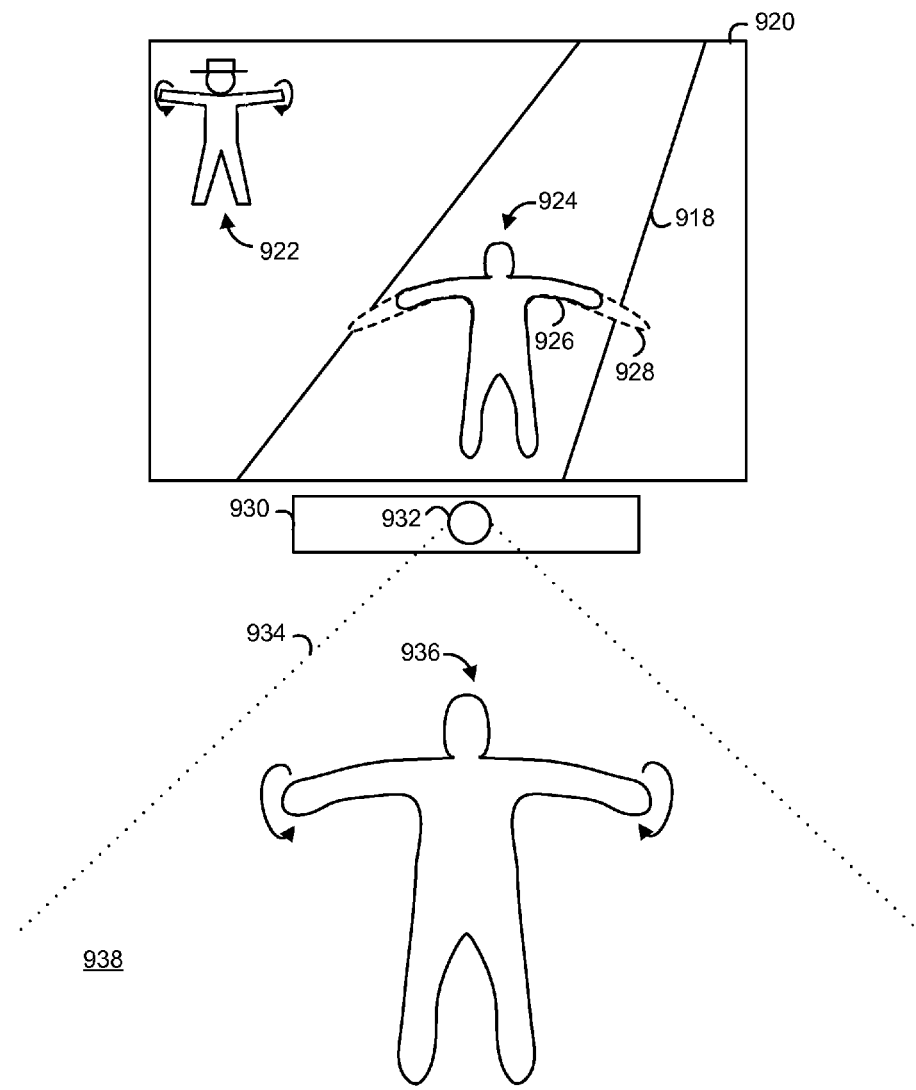
FIG. 9c depicts an example display in connection with the method of FIG. 9a, where a first trait of an avatar is defined in a first time period.

FIG. 9c depicts an example display in connection with the method of FIG. 9a, where a first trait of an avatar is defined in a first time period. A display 920 and depth camera system 930 are depicted. The depth camera system 930 has an example sensor 932 with a field of view 934 (between dotted lines) in a physical space 938 for detecting movement of a person 936. An example application includes a virtual space having a road 918 on which an avatar 924 of the person 936 walks.

In a first time period, an optional coaching avatar 922 informs the person that the trait which is currently being defined is the appearance of the arms of the avatar 924. The coaching avatar may say: "Let's define our arms now." The coaching avatar may demonstrate a specific bodily movement, such as raising both arms outward and rotating the arms in circles. The person 936 performs the requested bodily movement, in response to which the application cause the arms of the avatar to become longer, for instance, transitioning from a normal length arm 926 to a long, distorted length arm 928 (dashed lines). The arms of the avatar may become gradually longer as the person performs the movement. A time period for defining the arm length can be enforced. In one approach, the session for defining the arm length is ended after a specified amount of time. Or, the session for defining the arm length can continue as long as the person performs the movement, perhaps until some arm length limit is reached.

Note that if a specific task is being carried out to define traits of the arms, the display 920 can provide the avatar 924 so that only its arms are changing. Other movements of the avatar which would normally reflect movements of the tracked person can be inhibited. This allows the person to clearly see the specific trait.

Generally, individual parts of an avatar can be defined asynchronously and subsequently fitted together. Or, multiple avatars in a scene can be isolated have their traits define synchronously or asynchronously. Moreover, the definitions can be provided by people locally, in one physical space, or via a network, from different physical spaces. A multi-track recording can be made which includes both human and non-human avatars. Many variations and permutations can be provided beyond one person-to-one avatar. The variations include multiplexing across multiple users, asynchronous recording, human and non-human avatars, augmentations, voice and sound, voice and motion cross-augmentations.

Figure 9D:
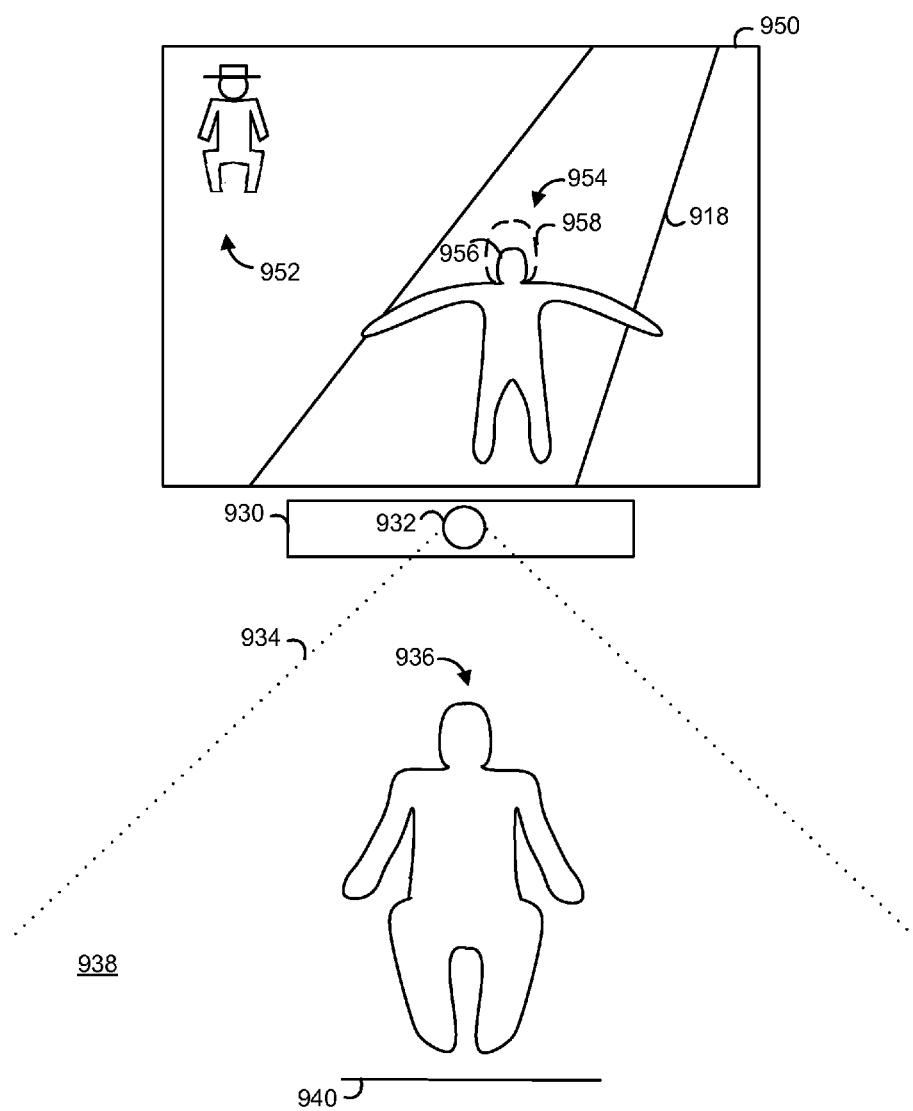
FIG. 9d depicts an example display in connection with the method of FIG. 9a, where a second trait of an avatar is defined in a second time period.

FIG. 9d depicts an example display in connection with the method of FIG. 9a, where a second trait of an avatar is defined in a second time period. In the display 950, a coaching avatar 952 informs the person 936 that the trait which is currently being defined is the size of the head of the avatar 954. The coaching avatar may say: "Let's define our head now." The coaching avatar may demonstrate a specific bodily movement, such as jumping up or squatting down. The person 936 performs the requested bodily movement relative to a ground level 940, in response to which the application causes the head of the avatar to become bigger, for instance, transitioning from a normal sized head 956 to a larger, distorted size head 958 (dashed lines). The head of the avatar may become gradually larger as the person performs the movement. A time period for defining the head size can be enforced. In one approach, the session for defining the head size is ended after a specified amount of time. Or, the session for defining the head size can continue as long as the person performs the movement, perhaps until some head size limit is reached.

Note that the long arms which were defined in the first time period (FIG. 9c) are exhibited again in the second time period, so that the avatar's traits are built up serially.

The arms and head are examples of body parts whose size or shape can be modified.

An avatar's traits can also be defined based on a person's voice, such as tone or volume. As an example, the avatar's head can get bigger as a person speaks louder.

Note that it is possible for the application to allow the avatar's traits to be defined at any time, and not just at a directed time. For example, an application may provide a game in which an avatar needs to reach and touch an object that is out of reach. The person can perform the movement which causes the arm to grow longer at the time the person realizes that the avatar needs to reach the object.

Figure 9E:
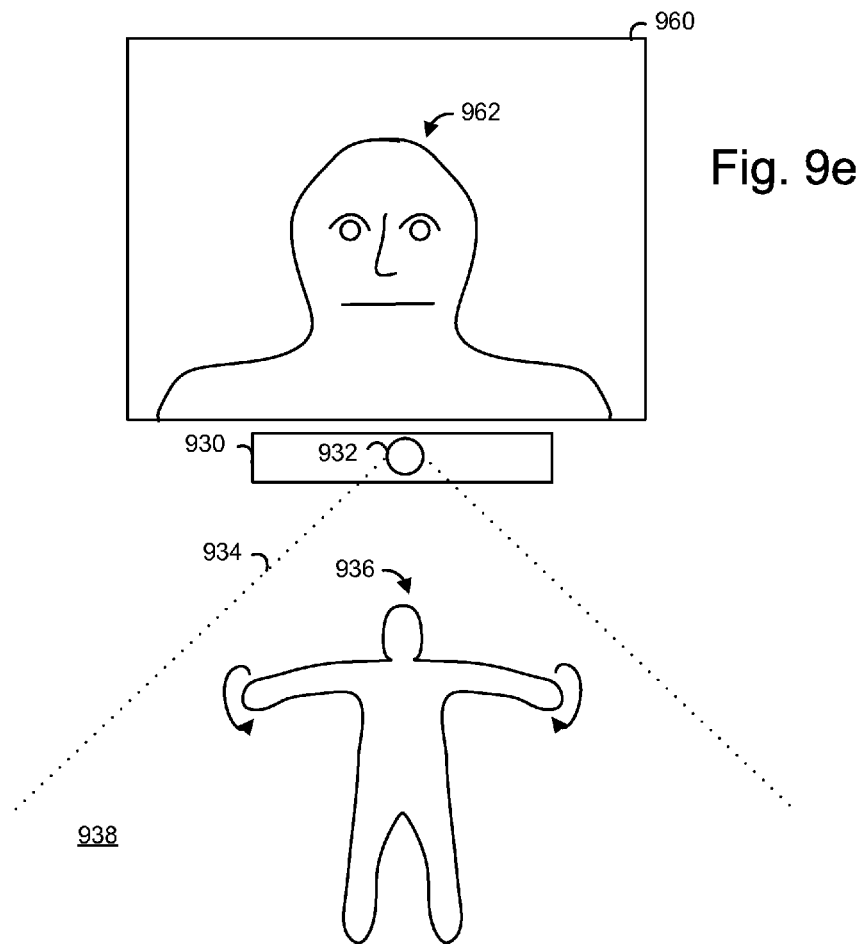
FIGS. 9e and 9f depict example displays in connection with the method of FIG. 9a, where a facial trait of an avatar is defined.
Figure 9F:
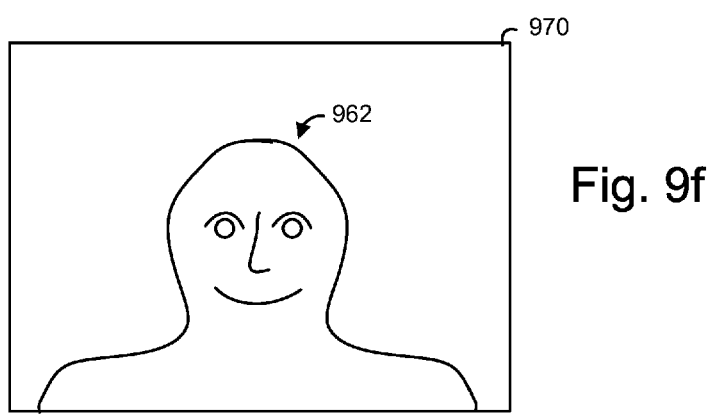

FIGS. 9e and 9f depict example displays in connection with the method of FIG. 9a, where a facial trait of an avatar is defined. The display 960 provides a close up view of an avatar 962 and its face. Initially, in FIG. 9e, the avatar has one facial expression, such as a neutral emotion, as indicated by the absence of a smile (the mouth is a horizontal line). In FIG. 9f, in the display 970, the avatar has another facial expression, such as a happy emotion, as indicated by the smile (the mouth is an upwardly curved line). The facial expression of FIG. 9f can be created by the application in response to the person performing some bodily movement such as raising both arms outward and rotating the arms in circles. The facial expression could exhibit a more pronounced smile in proportion to the extent to which the person performs the movement, e.g., with larger circles or a faster rotation.

It is also possible for the person to provide a voice command which is recognized by the application using voice recognition. For example, the person may speak the words: "Define face." The application responds by providing the close up view of the avatar's face. The person then speaks the word: "Happy" and performs the specific bodily movement to define a degree of happiness. Alternatively, the person speaks the word: "Scared" and performs the specific bodily movement to define a degree to which the avatar is scared. An avatar that is scared may de depicted by the trait of its hair standing on end, for instance. The application can be configured to enable the person to define a variety of facial expressions and emotions. The person can use his or her voice and body position and movements to define facial expressions, eye motions and body poses of the avatar.

Generally, voice data from one or more persons can be used as an input to the application. The application can perform speech recognition to understand the words that are spoken. A volume level of the speech can also be used as an input, e.g., as the person talks louder, the avatar exhibits a facial expression of greater anger. For example, the avatar may squint when angry, and perhaps alter its posture. A curious avatar may arch his eyebrows. Or, as the person talks louder, the avatar's voice can change to be like a monster's voice. Speech can also be associated with a particular person, in a player association. For instance, multiple persons in a physical space may control respective avatars or other aspects of an application with their speech. The speech of one person can be recognized and used to control an avatar for that person. Or, the speech of one person can be recognized and used to control one trait for multiple avatars. This is a form of emotional amplification in which the person's emotions are amplified an exhibited in the application such as by the avatar. It is also possible to recognize a person by his or her body shape and/or size so that the person's movements are translated into changes to a respective avatar or to a trait of multiple avatars.

A camera angle or viewpoint of the virtual space can be modified based on the person's movements and/or voice. For instance, if the person speaks more softly, a more close up view of the virtual space could be displayed than if the person speaks more loudly. Various types of real time augmentation can be applied to the virtual space, including characters' expressions, poses, stances and so forth, based on the combination of movement and audio inputs. This provides a unique performance capture of one or more persons in real time.

Regarding the avatar, it can be human-like or non-human. For example, an avatar could be a multi-headed, multi-legged octopus, where the person defines the number of heads and legs, as well as traits of each head and leg, e.g., color, shape, length and so forth.

In another aspect, a trait of one avatar can be affected by the trait of another avatar. For example, if a first avatar has a happy facial expression and posture, and a second avatar enters the virtual space who has an angry expression and posture, the first avatar can adopt a scared facial expression and posture.

In another aspect, multiple people can control one avatar at the same time. For example, in FIG. 9b it was mentioned that a first person can define one trait of an avatar after which a second person defines another trait of the same avatar. In an example of blending, multiple people control the same avatar concurrently with their movements and/or voice. For example, a first person can control the legs of the avatar and the second person can control the arms. Or, the avatar can be a four-legged animal such as a horse, where the first person's movements and/or voice are used by the application to control the back end of the horse and the second person's movements and/or voice are used by the application to control the front end of the horse. Such blended control of an avatar can provide an entertaining experience.

Note that the bodily movements of the person which can be detected by a motion capture system can include movements in the face, such as changes in facial expressions. Eye movements could also be tracked to provide an input to an application.

Another possibility is to track a prop which is held by a person in the physical space. For example, a prop may be a plastic sword which is swung by the person. This can cause the person's avatar to adopt an aggressive appearance and tone of voice, for instance.

Another example is causing actions in the virtual space other than modifying traits of an avatar. For example, if the virtual space is a nightclub, the person can sway back and forth and rock their arms in a dancing motion to cause the application to start playing music and change the lighting in the virtual space, such as by providing a disco ball. Or, if the virtual space is a beach, the person may start waving their arms around to cause the application to display beach balls which can be batted around by the person's avatar.

Figure 10A:
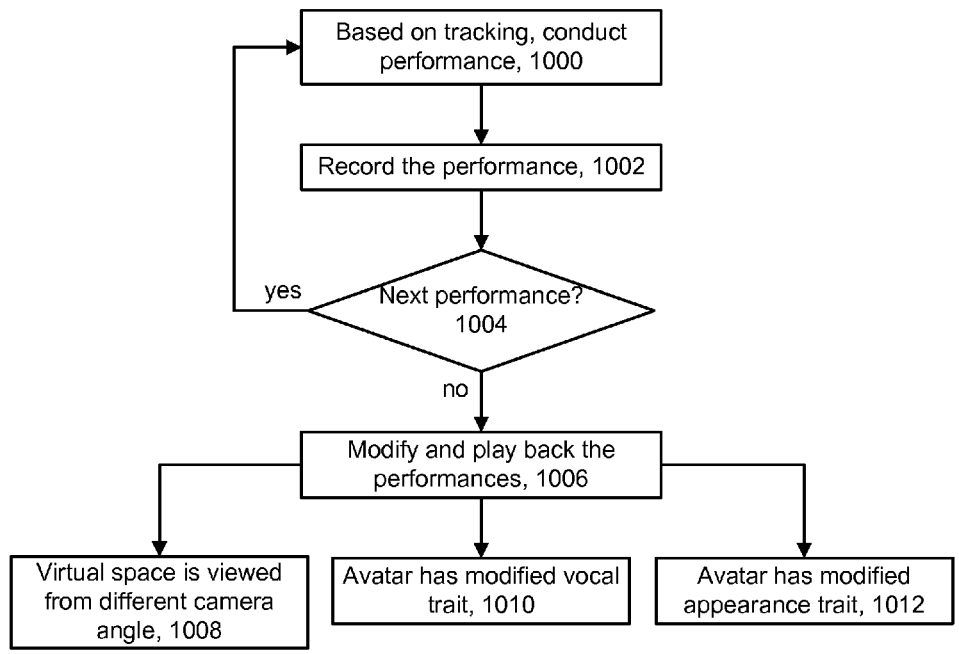
FIG. 10a depicts another example method for updating a virtual space as set forth in step 506 of FIG. 5, where performances are recorded, modified and played back.

FIG. 10a depicts another example method for updating a virtual space as set forth in step 506 of FIG. 5, where performances are recorded, modified and played back. In this approach, a performance can refer to an audio-visual record of the virtual space which is responsive to movement of at least one person and/or the at least one person's voice. The performance can include, e.g. one or more persons defining one or more traits of an avatar, such as discussed in connection with FIGS. 9a-f, and one or more pre-scripted audio-visual events, such as discussed in connection with FIGS. 7b-d, 8a-c, 11a and 11b. The performance can be directed in some cases. The performance can also include other interactions of a person with an application which do not involve defining avatar traits or pre-scripted audio-visual events based on bodily movements or audio inputs by a person. Step 1000 includes conducting a performance based on tracking of a person. At decision step 1002, the performance is recorded. This can include recording the entire performance so that it can be played back and reviewed by the person. At decision step 1004, if a next performance is to be performed, steps 1000 and 1002 are repeated. A series of different performances in a virtual space can be recorded, one after the other, where each respective performance is initiated based on a respective detected movement in a respective time period.

At step 1006, the one or more performances are played back. Modifications can be automatically made during the playback, such as by processing the recorded performances to add the modifications when the performances are recorded, or processing the recorded performances to add the modifications when the performances are played back. Various types of modifications can be applied. Step 1008 indicates that the virtual space is played back from a different camera angle. See FIG. 10b for an example.

Step 1010 indicates that the avatar has a modified vocal trait, such as tone, accent (including regional and national), cadence, rhythm, intonation, degree of articulation, loudness level, speaking in a different language, or the like. For example, an avatar may speak with a proper British accent and diction in one performance which is automatically modified to a Southern drawl in the play back. Generally, an avatar may speak at certain times as it explores a virtual space according to instructions of the application. These instructions can be processed to generate the modified speech in the play back.

Step 1012 indicates that the avatar has a modified appearance trait. For instance, a costume, including clothes, of the avatar can be modified, in addition to hair style and color, posture and manner of walking and so forth could be modified.

Figure 10B:
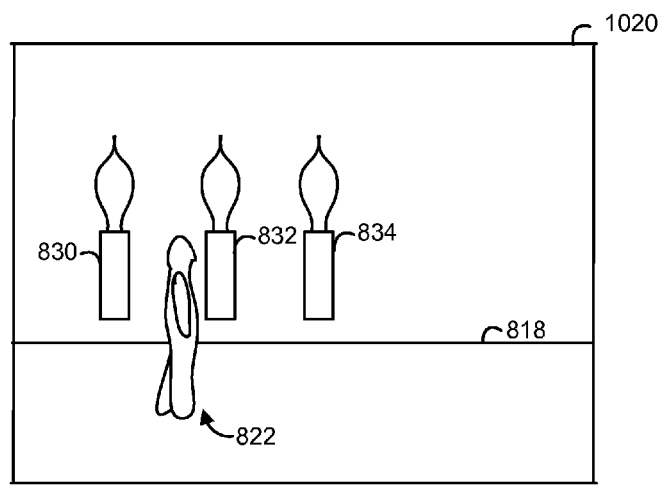
FIG. 10b depicts an example display in connection with the method of FIG. 10a, in which a performance in a virtual space is played back with a different camera angle.

FIG. 10b depicts an example display in connection with the method of FIG. 10a, in which a performance in a virtual space is played back with a different camera angle. The camera angle can refer to the point of view which is seen by a viewer of a display which displays a virtual space. In the display 1020, a different camera angle of the same scene as in FIG. 8c is provided. The scene includes the torches 830, 832, 834, road 818 and avatar 822, which is seen here in a profile view instead of the perspective view of FIG. 8c.

Example Scenario

An example scenario in which a player is directed in exploring a virtual space can include four distinct phases: warm up, scene, pay off and post game. During the warm up, the player's avatar is placed in a costume for the scene and environmental objects, both interactive and static, slowly appear in a scene at a pace that allows the player to experiment with various aspects of the scene. When the scene is fully built, a spot light appears and the player is instructed to have its avatar step into the spot light and say "Go!" to start the scene. An alternative visual cue is to provide footprints showing where the player's avatar should stand.

In the scene phase of the example scenario, lighting and camera angles may change when the scene starts. Over the course of a scene, specific directions are issued to the player that should to be followed to have the scene continue. Each successfully completed direction generates a fun "moment" (some kind of animated or dynamic event) before moving on to the next direction. Directed moments are actions that are required to continue the scene. These can be represented on the display by a visual cue such as green dots on the ground.

Once the player's avatar stands on them, directions are provided to the player. Optional moments are actions that are not required for the scene to continue. However, the player is rewarded for executing these actions. These can be represented on the display with a visual cue such as yellow dots on the ground. Discoverable moments are actions that discoverable by the player, and are not identified by a visual cue on the display. A scene can include a number of directed and optional moments, for instance.

In the pay off phase of the example scenario, once the player has performed the final directed movement, the scenes which were just created are compiled and played back for the player. On playback, however, various aspects of the scene are automatically modified, e.g., with new camera angles, enhanced soundtrack, modulated player voice, and revealing a surprise final moment. In another option, during playback, the player can select a "change costume" command which causes all characters in the scene to exchange their costumes, e.g., clothes.

In the post game phase of the example scenario, once the payoff is complete, the player can be prompted with a few options. One option is to replay by playing the pay off again. Another option is to share, by sharing the performance with another person, e.g., via a network. Another option allows the player to play the scene again. Another option is to select another scene.

Figure 11A:
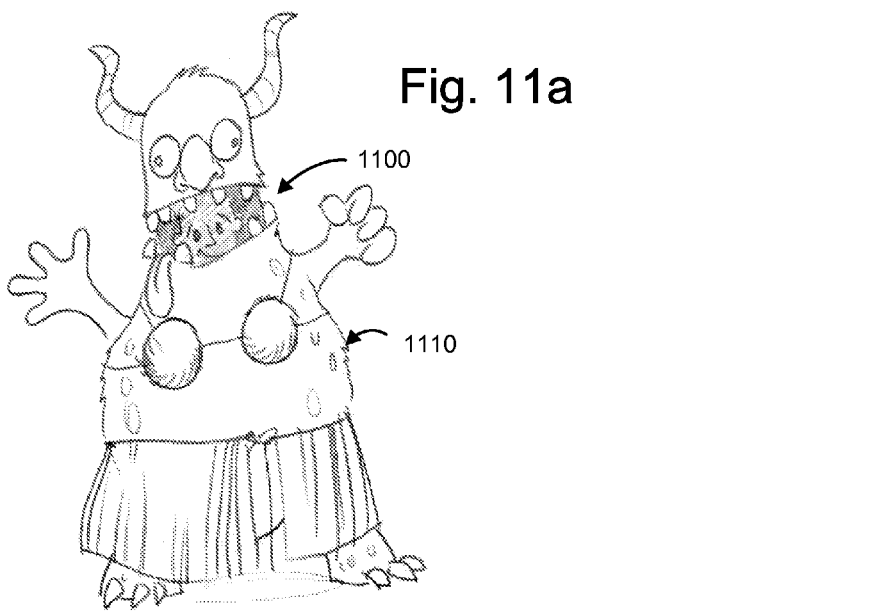
FIG. 11a depicts an example avatar and its costume in a monster luau scenario.
Figure 11B:
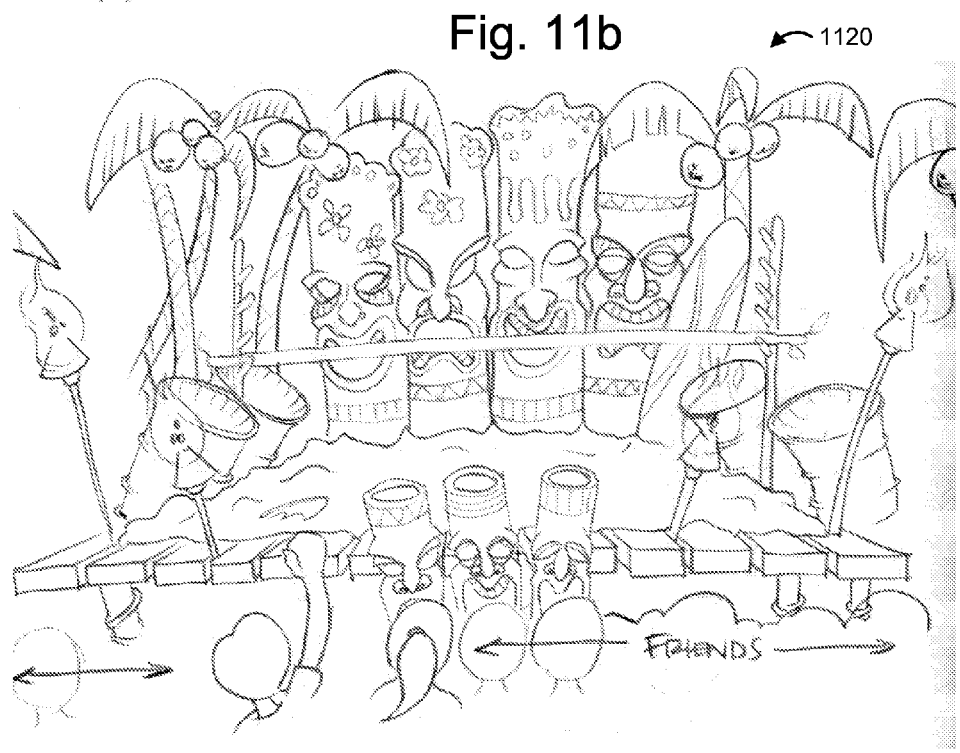
FIG. 11b depicts an example scene in a monster luau scenario.

An example of the scene phase of the example scenario is a monster luau. FIG. 11a depicts an example avatar 1100 and its costume 1110 in a monster luau scenario, and FIG. 11b depicts an example scene 1120 in the monster luau scenario. The avatar has a costume of a funny monster. The scene 1120 can be a Hawaiian luau built on a wooden platform. The player tries to use the monster's abilities to start a party. Interactive environmental objects can include beach balls to hit, steel drums to hit, and small totem poles to ignite. Movements of the player are translated to movements of the avatar to interact with the objects.

Moments include:

Directed moment 1: Stand at a microphone and say "Let's party." Result: music starts and the crowd cheers.

Directed moment 2: Light up the Tiki torches. Result: when the player bends over, flames come out of the avatar's mouth and light the torches.

Directed moment 3: Limbo under the stick. Result: player has to lean back and limbo his or her avatar under a stick. Crowd cheers.

Optional moment: Player raises hands over head and waves arms side to side. Result: crowd mimics the player's actions.

Optional moment: Player says "Limbo!" Result: player says line and crowd repeats it.

Optional moment: Player does the hula dance. Result: coconut bikini and skirt appear on the player's avatar (FIG. 11a).

Discoverable moment: Player jumps. Result: scene shakes and coconuts fall from the trees.

Discoverable moment: Bang the drums. Result: steel drum sounds emit.

Discoverable moment: Hit the small totem poles with hands. Result: small fireworks shoot out.

Discoverable moment: Hit the large totem poles with hands. Result: large fireworks shoot out.

Discoverable moment: Stand in front of the large totem poles. Result: totem poles act like pipes in an organ. Each totem pole has a different pitch.

Pay off Moment: Player is asked to jump. The back Tiki torches shoot out a burst of fire, causing the player's avatar to catch on fire. Player's avatar runs around the stage. Friend uses fire extinguisher to put fire out. Crowd cheers.

The results of the above-mention moments are examples of pre-scripted audio-visual events in the virtual space.

The following are different types of mechanisms to help direct the player through the experience.

Moment indicators on stage—directed and optional moments are indicated on the floor of the stage with visual cues. Examples include: a) colored circle with an arrow pointing down, b) colored feet showing the player's avatar where to stand, and c) spotlight shining down on the stage.

Direction indicators—these show the player how to perform. They might request the player to move his or her body in a particular way or to bang on a drum. Examples include: a) an avatar friend holding up a sign showing the player what to do or say, b) a coach avatar demonstrating the requested movement, c) a narrator telling the player what to do, and d) a combination of multiple indicators.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A motion capture system, comprising:
a depth camera system, the depth camera system obtains images of a field of view;
a display; and
a processor in communication with the depth camera system and the display, the processor executes instructions to:
display a virtual space comprising an avatar on the display, provide directions to a person, the person performs movements in the field of view in a first time period in response to the directions, process the images to detect the movements of the person, update the virtual space so that the avatar provides a performance, the avatar exhibits a trait and moves correspondingly to the movements of the person in real time as the person performs the movements in the performance, and provide a play back of the performance in a second time period, the avatar exhibits a modification to the trait and moves correspondingly to the movements of the person in the play back of the performance.

2. The motion capture system of claim 1, wherein:
the trait comprises a costume of the avatar.

3. The motion capture system of claim 2, wherein:
the costume of the avatar is exchanged with another avatar in the virtual space.

4. The motion capture system of claim 1, wherein:
the trait comprises at least one of a hair color or a hair style of the avatar.

5. The motion capture system of claim 1, wherein:
the modification to the trait comprises a modulation of a voice.

6. The motion capture system of claim 1, wherein:
the trait comprises a facial expression.

7. The motion capture system of claim 1, wherein:
the trait comprises a manner of walking.

8. The motion capture system of claim 1, wherein:
the trait comprises a vocal trait.

9. The motion capture system of claim 8, wherein:
the vocal trait comprises at least one of tone, accent, cadence, rhythm, intonation, degree of articulation or loudness.

10. The motion capture system of claim 1, wherein:
the trait comprises a language, such that the avatar speaks in a different language in the play back of the performance in the second time period than in the performance in the first time period.

11. A processor-implemented method in a motion capture system, comprising the processor-implemented steps of:
receiving images of a person in a field of view of the motion capture system, the person performs movements in the field of view;
displaying a virtual space on a display, the virtual space comprises an avatar which represents the person;
based on the images, detecting the movements of the person;
in a first time period, creating a scene in a performance in the virtual space by translating the movements of the person to movements of an avatar in the virtual space as the person explores different features of the virtual space; and
in a second time period, playing back the performance by depicting the movements of the avatar with a modification of the scene.

12. The processor-implemented method of claim 11, wherein:
the modification of the scene comprise a different viewpoint of the virtual space in the second time period than in the first time period.

13. The processor-implemented method of claim 11, wherein:
the modification of the scene comprise a different lighting in the second time period than in the first time period.

14. The processor-implemented method of claim 11, wherein:
the modification of the scene comprise an enhanced soundtrack of the scene.

15. A computer readable storage device comprising computer readable software embodied thereon for programming a processor to perform a method in a motion capture system, the method comprising:
receiving images of a person in a field of view of the motion capture system;
displaying a virtual space on a display, the virtual space comprises an avatar which represents the person;
based on the images, detecting the person;
displaying the avatar in the virtual space;
providing a plurality of directed moments in a performance of the avatar, each directed moment of the plurality of directed moments requires the person to complete a directed movement and each directed movement must be successfully completed before a next directed moment of the plurality of directed moments, until a final directed moment of the plurality of directed moments is reached, the avatar moves correspondingly to the directed movements of the person to interact with objects in the virtual space;
providing a record of the performance of the avatar; and
once the person has successfully completed the final directed moment, automatically modifying the record of the performance to provide a modified record, and playing back the modified record.

16. The computer readable storage device of claim 15, wherein:
the directed movements are indicated by a plurality of visual cues in the virtual space.

17. The computer readable storage device of claim 16, wherein:
one visual cue of the plurality of visual cues is on a ground in the virtual space; and
the person performs one of the directed movements by causing the avatar to stand on the one of the visual cues.

18. The computer readable storage device of claim 15, wherein:
providing an optional moment in the performance of the avatar, the optional moment provides a visual cue in the virtual space for an action to perform; and
providing a visual reward in response to completion of the action by the person.

19. The computer readable storage device of claim 15, wherein:
providing a discoverable moment in the performance of the avatar, the discoverable moment comprises an action that is discoverable by the person but is not identified by a visual cue in the virtual space; and
providing a result in the virtual space in response to discovery of the action by the person.

20. The computer readable storage device of claim 15, wherein:
the modified record provides a surprise final moment of the performance.

* * * * *